United States Patent
Gong et al.

(10) Patent No.: US 10,146,593 B2
(45) Date of Patent: *Dec. 4, 2018

(54) TECHNIQUES FOR DECENTRALIZED LOAD BALANCING

(71) Applicant: SAS Institute Inc., Cary, NC (US)

(72) Inventors: Qing Gong, Cary, NC (US); Shianchin "Sam" Chen, Apex, NC (US); Zhiyong Li, Chapel Hill, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,591

(22) Filed: Dec. 22, 2017

(65) Prior Publication Data

US 2018/0239651 A1 Aug. 23, 2018

Related U.S. Application Data

(63) Continuation of application No. 15/852,467, filed on Dec. 22, 2017.

(Continued)

(51) Int. Cl.
*G06F 9/46* (2006.01)
*G06F 15/173* (2006.01)
(Continued)

(52) U.S. Cl.
CPC ............ *G06F 9/5083* (2013.01); *G06F 3/067* (2013.01); *G06F 9/505* (2013.01); *G06F 9/5044* (2013.01); *G06F 9/5072* (2013.01); *G06F 11/3423* (2013.01); *G06F 11/3433* (2013.01); *G06F 12/084* (2013.01)

(58) Field of Classification Search
None
See application file for complete search history.

(56) References Cited

U.S. PATENT DOCUMENTS 6,748,593 B1 * 6/2004 Brenner ................ G06F 9/5083
709/223
7,295,952 B1 11/2007 Cheng et al.
(Continued)

OTHER PUBLICATIONS

Timme, Falco, "Setting Up a High-Availability Load Balancer (With Failover and Session Support) With HAProxy/Heartbeat on Debian Etch", Version 1.0, retrieved from <https://www.howtoforge.com/high-availability-load-balancer-haproxy-heartbeat-debian-etch>, 15 pages.

(Continued)

*Primary Examiner* — Bing Zhao

(57) ABSTRACT

Various embodiments are generally directed to decentralized load balancing in a host cluster utilized to coordinate performance of processing tasks in a workload, such as via service agents and/or host instances included in the host cluster, for instance. Some embodiments are particularly directed to a set of service agents on one or more host instances that utilize a shared cache to coordinate among themselves to automatically balance a workload without a centralized controller or a centralized load balancer. In one or more embodiments, a set of service agents may automatically and cooperatively balance a workload among themselves using the shared cache.

27 Claims, 25 Drawing Sheets

Related U.S. Application Data

(60) Provisional application No. 62/460,360, filed on Feb. 17, 2017.

(51) Int. Cl.
  *G06F 9/50* (2006.01)
  *G06F 12/084* (2016.01)
  *G06F 11/34* (2006.01)
  *G06F 3/06* (2006.01)

(56) References Cited

U.S. PATENT DOCUMENTS

| | | | | |
|---|---|---|---|---|
| 7,937,493 | B2 * | 5/2011 | Colrain | G06F 9/505 |
| | | | | 370/408 |
| 9,930,122 | B1 * | 3/2018 | Kilday | H04L 67/142 |
| 2001/0018701 | A1 * | 8/2001 | LiVecchi | G06F 9/4881 |
| | | | | 718/105 |
| 2015/0312335 | A1 | 10/2015 | Ying et al. | |

OTHER PUBLICATIONS

The Apache Software Foundation, MapReduce Tutorial, published Aug. 4, 2013, 1 https://tradoop.apache.org/docs/r1.2.1/mapred_tutorial.html, 34 pages.

* cited by examiner

Shared cache 1362

Active agents 1352

Task type 1354-1
- Active agent(s) 1356-1
- Timestamp(s) 1360-1

Task type 1354-2
- Active agent(s) 1356-2
- Timestamp(s) 1360-2

⋮

Task type 1354-n
- Active agent(s) 1356-n
- Timestamp(s) 1360-n

Task queue 1365
- Task 1352-1
- Task 1352-2
- ...
- Task 1352-n

Wherein when the time elapsed is at or below the service threshold, the processor to perform operations comprising identify a number of agents in the active state associated with the second host instance via the shared cache;
1814

Wherein when the time elapsed is at or below the service threshold, the processor to perform operations comprising place the first service agent in the sleep state when a difference between the number of agents in the active state associated with the second host instance and a number of agents in the active state associated with the first host instance is at or below a load difference threshold; and
1816

Wherein when the time elapsed is at or below the service threshold, the processor to perform operations comprising set the first service agent as one of the one or more agents in the active state for the first task type in the shared cache and update the value of the first timestamp in the shared cached when the difference between the number of agents in the active state associated with the second host instance and the number of agents in the active state associated with the first host instance is above the load difference threshold.
1818

Compare, with the second service agent, the difference between the number of active service agents associated with the first host instance and the number of active service agents associated with the second host instance to a load difference threshold; and
1914

Update, with the second service agent, the data structure in the shared cache to indicate that the second service agent is the active agent for the task to reduce a portion of the workload performed by the first service agent of the one or more service agents implemented by the first host instance in the cluster of host instances when the difference between the number of active service agents associated with the first host instance and the number of active service agents associated with the second host instance exceeds the load difference threshold.
1916

TECHNIQUES FOR DECENTRALIZED LOAD BALANCING

CROSS-REFERENCE TO RELATED APPLICATIONS

This application is a continuation of, and claims the benefit of priority under 35 U.S.C. § 120 to, U.S. patent application Ser. No. 15/852,467 filed Dec. 22, 2017, the entirety of which is incorporated herein by reference. U.S. patent application Ser. No. 15/852,467 claims the benefit of priority under 35 U.S.C. § 119(e) to U.S. Provisional Application Ser. No. 62/460,360 filed Feb. 17, 2017, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising: initialize a first timer associated with a first service agent in a set of service agents implemented by a first host instance, the set of service agents comprising two or more service agents, wherein each service agent in the set of service agents is in a state of one or more states, the one or more states including a sleep state and an active state; transition the first service agent from the sleep state to the active state in response to expiration of the first timer; determine, via a shared cache, that the first service agent is not one of one or more agents in the active state for a first task type based on a data structure in the shared cache that indicates the one or more agents in the active state for the first task type, the shared cache accessible to a cluster of two or more host instances, the cluster of host instances including the first host instance and a second host instance; identify a value of a first timestamp of one or more timestamps in the shared cache based on an association of the first timestamp with the first task type in the shared cache, the first timestamp associated with performance of a task of the first task type by one of the one or more agents in the active state for the first task type and implemented by the second host instance; determine a time elapsed between the value of the first timestamp and a current time, wherein when the time elapsed is above a service threshold, the processor to perform operations comprising set the first service agent as one of the one or more agents in the active state for the first task type in the data structure in the shared cache and update the value of the first timestamp associated with the first task type in the shared cache, and wherein when the time elapsed is at or below the service threshold, the processor to perform operations comprising: identify a number of agents in the active state associated with the second host instance via the shared cache, place the first service agent in the sleep state when a difference between the number of agents in the active state associated with the second host instance and a number of agents in the active state associated with the first host instance is at or below a load difference threshold, and set the first service agent as one of the one or more agents in the active state for the first task type in the shared cache and update the value of the first timestamp in the shared cached when the difference between the number of agents in the active state associated with the second host instance and the number of agents in the active state associated with the first host instance is above the load difference threshold.

In some embodiments, the processor may be caused to perform operations comprising perform a respective task of the first task type with the first service agent when the first service agent is identified as one or the one or more agents in the active state for the first task type in the data structure in the shared cache.

In one or more embodiments, the processor may be caused to perform operations comprising update the value of the first timestamp in the shared cache in response to performance of the respective task of the first task type.

In various embodiments, the first timestamp may be associated with the first task type and one of the one or more agents in the active state for the first task type, and wherein setting the first service agent as one of the one or more agents in the active state for the first task type associates the first timestamp with the first service agent.

In some embodiments, the processor may be caused to perform operations comprising: initialize a second timer associated with a second service agent in the set of service agents implemented by the first host instance; transition the second service agent from the sleep state to the active state in response to expiration of the second timer; determine the second service agent is one of one or more agents in the active state for a second task type via the shared cache based on a second data structure in the shared cache that indicates the one or more agents in the active state for the second task type; update a value of a second timestamp of the one or more timestamps in the shared cache to a second current time, the second timestamp associated with the second task type and the second service agent, wherein the value of the second timestamp that is updated is associated with performance of a respective task of the second task type by the second service agent; and perform the respective task of the second task type with the second service agent.

In one or more embodiments, the first task type and the second task type may comprise a same task type.

In various embodiments, the first service agent may comprise a metric collecting agent and the first task type comprising a resource metric collection service to monitor dynamic metrics associated with health of a software system.

In some embodiments, the processor may be caused to perform operations comprising: comparing processing capabilities of hardware resources available to the first host instance to processing capabilities of hardware resources available to the second host instance; and determining the load difference threshold based on the comparison, wherein when the processing capabilities of the hardware resources available to the first host are equal to the processing capabilities of the hardware resources available to the second host, the load difference threshold is determined to be zero.

In one or more embodiments, the service threshold may comprise a time equal to twice a service interval, wherein the service interval comprises an amount of time between initialization and expiration of the first timer.

In some embodiments, the task of the first task type may be included in a workload comprising a plurality of tasks, wherein the cluster of host instances utilizes the shared cache to balance the plurality of tasks in the workload among the host instances in the cluster without a centralized controller or load balancer.

Various embodiments described herein may include a computer-implemented method, comprising: initializing a first timer associated with a first service agent in a set of service agents implemented by a first host instance, the set of service agents comprising two or more service agents, wherein each service agent in the set of service agents is in a state of one or more states, the one or more states including a sleep state and an active state; transitioning the first service agent from the sleep state to the active state in response to expiration of the first timer; determining, via a shared cache, that the first service agent is not one of one or more agents in the active state for a first task type based on a data structure in the shared cache that indicates the one or more agents in the active state for the first task type, the shared cache accessible to a cluster of two or more host instances, the cluster of host instances including the first host instance and a second host instance; identifying a value of a first timestamp of one or more timestamps in the shared cache based on an association of the first timestamp with the first task type in the shared cache, the first timestamp associated with performance of a task of the first task type by one of the one or more agents in the active state for the first task type and implemented by the second host instance; determining a time elapsed between the value of the first timestamp and a current time, wherein when the time elapsed is above a service threshold, setting the first service agent as one of the one or more agents in the active state for the first task type in the data structure in the shared cache and update the value of the first timestamp associated with the first task type in the shared cache, and wherein when the time elapsed is at or below the service threshold: identifying a number of agents in the active state associated with the second host instance via the shared cache, placing the first service agent in the sleep state when a difference between the number of agents in the active state associated with the second host instance and a number of agents in the active state associated with the first host instance is at or below a load difference threshold, and setting the first service agent as one of the one or more agents in the active state for the first task type in the shared cache and update the value of the first timestamp in the shared cached when the difference between the number of agents in the active state associated with the second host instance and the number of agents in the active state associated with the first host instance is above the load difference threshold.

Some embodiments may include performing a respective task of the first task type with the first service agent when the first service agent is identified as one or the one or more agents in the active state for the first task type in the data structure in the shared cache.

One or more embodiments may comprise updating the value of the first timestamp in the shared cache in response to performance of the respective task of the first task type.

In various embodiments, the first timestamp may be associated with the first task type and one of the one or more agents in the active state for the first task type, and wherein setting the first service agent as one of the one or more agents in the active state for the first task type associates the first timestamp with the first service agent.

Some embodiments may include: initializing a second timer associated with a second service agent in the set of service agents implemented by the first host instance; transitioning the second service agent from the sleep state to the active state in response to expiration of the second timer; determining the second service agent is one of one or more agents in the active state for a second task type via the shared cache based on a second data structure in the shared cache that indicates the one or more agents in the active state for the second task type; updating a value of a second timestamp of the one or more timestamps in the shared cache to a second current time, the second timestamp associated with the second task type and the second service agent, wherein the value of the second timestamp that is updated is associated with performance of a respective task of the second task type by the second service agent; and performing the respective task of the second task type with the second service agent.

In one or more embodiments, the first task type and the second task type may comprise a same task type.

In some embodiments, the first service agent may comprise a metric collecting agent and the first task type comprising a resource metric collection service to monitor dynamic metrics associated with health of a software system.

Various embodiments may include one or more of the following: comparing processing capabilities of hardware resources available to the first host instance to processing capabilities of hardware resources available to the second host instance; and determining the load difference threshold based on the comparison, wherein when the processing capabilities of the hardware resources available to the first host are equal to the processing capabilities of the hardware resources available to the second host, the load difference threshold is determined to be zero.

In one or more embodiments, the service threshold may comprise a time equal to twice a service interval, wherein the service interval comprises an amount of time between initialization and expiration of the first timer.

In various embodiments, the task of the first task type may be included in a workload comprising a plurality of tasks, wherein the cluster of host instances utilizes the shared cache to balance the plurality of tasks in the workload among the host instances in the cluster without a centralized controller or load balancer.

Some embodiments described herein may include a computer-program product tangibly embodied in a non-transitory machine-readable storage medium, the computer-program product including instructions operable to cause a processor to perform operations comprising: initialize a first timer associated with a first service agent in a set of service agents implemented by a first host instance, the set of service agents comprising two or more service agents, wherein each service agent in the set of service agents is in a state of one or more states, the one or more states including a sleep state and an active state; transition the first service agent from the sleep state to the active state in response to expiration of the first timer; determine, via a shared cache, that the first service agent is not one of one or more agents in the active state for a first task type based on a data structure in the shared cache that indicates the one or more agents in the active state for the first task type, the shared cache accessible to a cluster of two or more host instances, the cluster of host instances including the first host instance and a second host instance; identify a value of a first timestamp of one or more timestamps in the shared cache based on an association of the first timestamp with the first task type in the shared cache, the first timestamp associated with performance of a task of the first task type by one of the one or more agents in the active state for the first task type and implemented by the second host instance; determine a time elapsed between the value of the first timestamp and a current time, wherein when the time elapsed is above a service threshold, the instructions to cause the processor to perform operations comprising set the first service agent as one of the one or more agents in the active state for the first task type in the data structure in the shared cache and update the value of the first timestamp associated with the first task type in the shared cache, and wherein when the time elapsed is at or below the service threshold, the instructions to cause the processor to perform operations comprising: identify a number of agents in the active state associated with the second host instance via the shared cache, place the first service agent in the sleep state when a difference between the number of agents in the active state associated with the second host instance and a number of agents in the active state associated with the first host instance is at or below a load difference threshold, and set the first service agent as one of the one or more agents in the active state for the first task type in the shared cache and update the value of the first timestamp in the shared cached when the difference between the number of agents in the active state associated with the second host instance and the number of agents in the active state associated with the first host instance is above the load difference threshold.

One or more embodiments may include instructions operable to cause the processor to perform operations comprising perform a respective task of the first task type with the first service agent when the first service agent is identified as one or the one or more agents in the active state for the first task type in the data structure in the shared cache.

Various embodiments may include instructions operable to cause the processor to perform operations comprising update the value of the first timestamp in the shared cache in response to performance of the respective task of the first task type.

In some embodiments, the first timestamp associated with the first task type and one of the one or more agents may be in the active state for the first task type, and wherein setting the first service agent as one of the one or more agents in the active state for the first task type associates the first timestamp with the first service agent.

One or more embodiments may include instructions operable to cause the processor to perform operations comprising: initialize a second timer associated with a second service agent in the set of service agents implemented by the first host instance; transition the second service agent from the sleep state to the active state in response to expiration of the second timer; determine the second service agent is one of one or more agents in the active state for a second task type via the shared cache based on a second data structure in the shared cache that indicates the one or more agents in the active state for the second task type; update a value of a second timestamp of the one or more timestamps in the shared cache to a second current time, the second timestamp associated with the second task type and the second service agent, wherein the value of the second timestamp that is updated is associated with performance of a respective task of the second task type by the second service agent; and perform the respective task of the second task type with the second service agent.

In various embodiments, the first task type and the second task type may comprise a same task type.

In some embodiments, the first service agent may comprise a metric collecting agent and the first task type comprising a resource metric collection service to monitor dynamic metrics associated with health of a software system.

One or more embodiments may include instructions operable to cause the processor to perform operations comprising: comparing processing capabilities of hardware resources available to the first host instance to processing capabilities of hardware resources available to the second host instance; and determining the load difference threshold based on the comparison, wherein when the processing capabilities of the hardware resources available to the first host are equal to the processing capabilities of the hardware resources available to the second host, the load difference threshold is determined to be zero.

In various embodiments, the service threshold may comprise a time equal to twice a service interval, wherein the service interval comprises an amount of time between initialization and expiration of the first timer.

In some embodiments, the task of the first task type may be included in a workload comprising a plurality of tasks, wherein the cluster of host instances utilizes the shared cache to balance the plurality of tasks in the workload among the host instances in the cluster without a centralized controller or load balancer.

One or more embodiments described herein may include a system comprising: a cluster having a plurality of host instances, each host instance in the cluster to implement one or more service agents, the one or more service agents to perform tasks included in a workload; a shared cache utilized by the one or more service agents of the plurality of hosts instances to automatically balance processing of the tasks in the workload among the host instances in the cluster without a centralized controller or a load balancer; a first service agent of the one or more service agents implemented by a first host instance in the cluster of host instances to perform a task in the workload based on a data structure in the shared cache that indicates the first service agent is an active agent for the task; a second service agent of the one or more service agents implemented by a second host instance in the cluster of host instances to: transition from a sleep state to an active state in response to expiration of a timer; identify a number of active service agents associated with the first host instance based on the data structure in the shared cache; compute a difference between the number of active service agents associated with the first host instance and a number of active service agents associated with the second host instance; compare the difference between the number of active service agents associated with the first host instance and the number of active service agents associated with the second host instance to a load difference threshold; and update the data structure in the shared cache to indicate that the second service agent is the active agent for the task to reduce a portion of the workload performed by the first service agent of the one or more service agents implemented by the first host instance in the cluster of host instances when the difference between the number of active service agents associated with the first host instance and the number of active service agents associated with the second host instance exceeds the load difference threshold.

In some embodiments, the first host instance and the second host instance may have local access to a synchronized copy of the shared cached.

In various embodiments, the second service agent initializes a timer and transitions into the sleep state when the difference between the number of active service agents associated with the first host instance and the number of active service agents associated with the second host instance does not exceed the load difference threshold.

In one or more embodiments, the second service agent performs a second task in the workload and updates a timestamp in the shared cached to a current time based on performance of the second task.

In some embodiments, the data structure may include an association between the timestamp and a type of the task.

In various embodiments, the first service agent comprising a metric collecting agent and wherein the task includes a portion of a resource metric collection service that monitors dynamic metrics associated with health of a software system.

In one or more embodiments, the first service agent may update a timestamp in the shared cached to indicate completion of the task.

In some embodiments, the first service agent may identify the task for performance based on a task queue in the shared cache.

In various embodiments, the load difference threshold may be determined based on a comparison of processing capabilities of hardware resources available to the first host instance to processing capabilities of hardware resources available to the second host instance.

In one or more embodiments, the load difference may be set to zero based on the comparison indicating the processing capabilities of the hardware resources available to the first host instance are equal to the processing capabilities of the hardware resources available to the second host instance.

Some embodiments described herein may include a computer-implemented method, comprising: implementing one or more service agents with each host instance in a cluster having a plurality of host instances, the one or more service agents to perform tasks included in a workload; utilizing a shared cache with the one or more service agents of the plurality of hosts instances to automatically balance processing of the tasks in the workload among the host instances in the cluster without a centralized controller or a load balancer; performing a task in the workload with a first service agent based on a data structure in the shared cache that indicates the first service agent is an active agent for the task, the first service agent of the one or more service agents implemented by a first host instance in the cluster of host instances; implementing a second service agent of the one or more service agents with a second host instance in the cluster of host instances, the second service agent for: transitioning from a sleep state to an active state in response to expiration of a timer; identifying a number of active service agents associated with the first host instance based on the data structure in the shared cache; computing a difference between the number of active service agents associated with the first host instance and a number of active service agents associated with the second host instance; comparing the difference between the number of active service agents associated with the first host instance and the number of active service agents associated with the second host instance to a load difference threshold; and updating the data structure in the shared cache to indicate that the second service agent is the active agent for the task to reduce a portion of the workload performed by the first service agent of the one or more service agents implemented by the first host instance in the cluster of host instances when the difference between the number of active service agents associated with the first host instance and the number of active service agents associated with the second host instance exceeds the load difference threshold.

In various embodiments, the first host instance and the second host instance may have local access to a synchronized copy of the shared cached.

In one or more embodiments, the second service agent may initialize a timer and transition into the sleep state when the difference between the number of active service agents associated with the first host instance and the number of active service agents associated with the second host instance does not exceed the load difference threshold.

In some embodiments, the second service agent may perform a second task in the workload and updates a timestamp in the shared cached to a current time based on performance of the second task.

In various embodiments, the data structure may include an association between the timestamp and a type of the task.

In one or more embodiments, the first service agent may comprise a metric collecting agent and wherein the task includes a portion of a resource metric collection service that monitors dynamic metrics associated with health of a software system.

In some embodiments, the first service agent may update a timestamp in the shared cached to indicate completion of the task.

In various embodiments, the first service agent may identify the task for performance based on a task queue in the shared cache.

In one or more embodiments, the load difference threshold may be determined based on a comparison of processing capabilities of hardware resources available to the first host instance to processing capabilities of hardware resources available to the second host instance.

In some embodiments, the load difference may be set to zero based on the comparison indicating the processing capabilities of the hardware resources available to the first host instance are equal to the processing capabilities of the hardware resources available to the second host instance.

Various embodiments described herein may include a computer-program product tangibly embodied in a non-transitory machine-readable storage medium, the computer-program product including instructions operable to cause a processor to perform operations comprising: implement one or more service agents with each host instance in a cluster having a plurality of host instances, the one or more service agents to perform tasks included in a workload; utilize a shared cache with the one or more service agents of the plurality of hosts instances to automatically balance processing of the tasks in the workload among the host instances in the cluster without a centralized controller or a load balancer; perform a task in the workload with a first service agent based on a data structure in the shared cache that indicates the first service agent is an active agent for the task, the first service agent of the one or more service agents implemented by a first host instance in the cluster of host instances; implement a second service agent of the one or more service agents with a second host instance in the cluster of host instances, the second service agent to: transition from a sleep state to an active state in response to expiration of a timer; identify a number of active service agents associated with the first host instance based on the data structure in the shared cache; compute a difference between the number of active service agents associated with the first host instance and a number of active service agents associated with the second host instance; compare the difference between the number of active service agents associated with the first host instance and the number of active service agents associated with the second host instance to a load difference threshold; and update the data structure in the shared cache to indicate that the second service agent is the active agent for the task to reduce a portion of the workload performed by the first service agent of the one or more service agents implemented by the first host instance in the cluster of host instances when the difference between the number of active service agents associated with the first host instance and the number of active service agents associated with the second host instance exceeds the load difference threshold.

In one or more embodiments, the first host instance and the second host instance may have local access to a synchronized copy of the shared cached.

In some embodiments, the second service agent may initialize a timer and transition into the sleep state when the difference between the number of active service agents associated with the first host instance and the number of active service agents associated with the second host instance does not exceed the load difference threshold.

In various embodiments, the second service agent performs a second task in the workload and updates a timestamp in the shared cached to a current time based on performance of the second task.

In one or more embodiments, the data structure may include an association between the timestamp and a type of the task.

In some embodiments, the first service agent may comprise a metric collecting agent and wherein the task includes a portion of a resource metric collection service that monitors dynamic metrics associated with health of a software system.

In various embodiments, the first service agent may update a timestamp in the shared cached to indicate completion of the task.

In one or more embodiments, the first service agent may identify the task for performance based on a task queue in the shared cache.

In some embodiments, the load difference threshold may be determined based on a comparison of processing capabilities of hardware resources available to the first host instance to processing capabilities of hardware resources available to the second host instance.

In various embodiments, the load difference may be set to zero based on the comparison indicating the processing capabilities of the hardware resources available to the first host instance are equal to the processing capabilities of the hardware resources available to the second host instance.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 13A and 13B illustrate operating environments for exemplary shared caches, according to some embodiments of the present technology.

FIGS. 18A and 18B illustrate an example of a second logic flow for a host instance, according to some embodiments of the present technology.

FIGS. 19A and 19B illustrates an example of a logic flow for a host cluster, according to some embodiments of the present technology.

DETAILED DESCRIPTION

Figure 1:
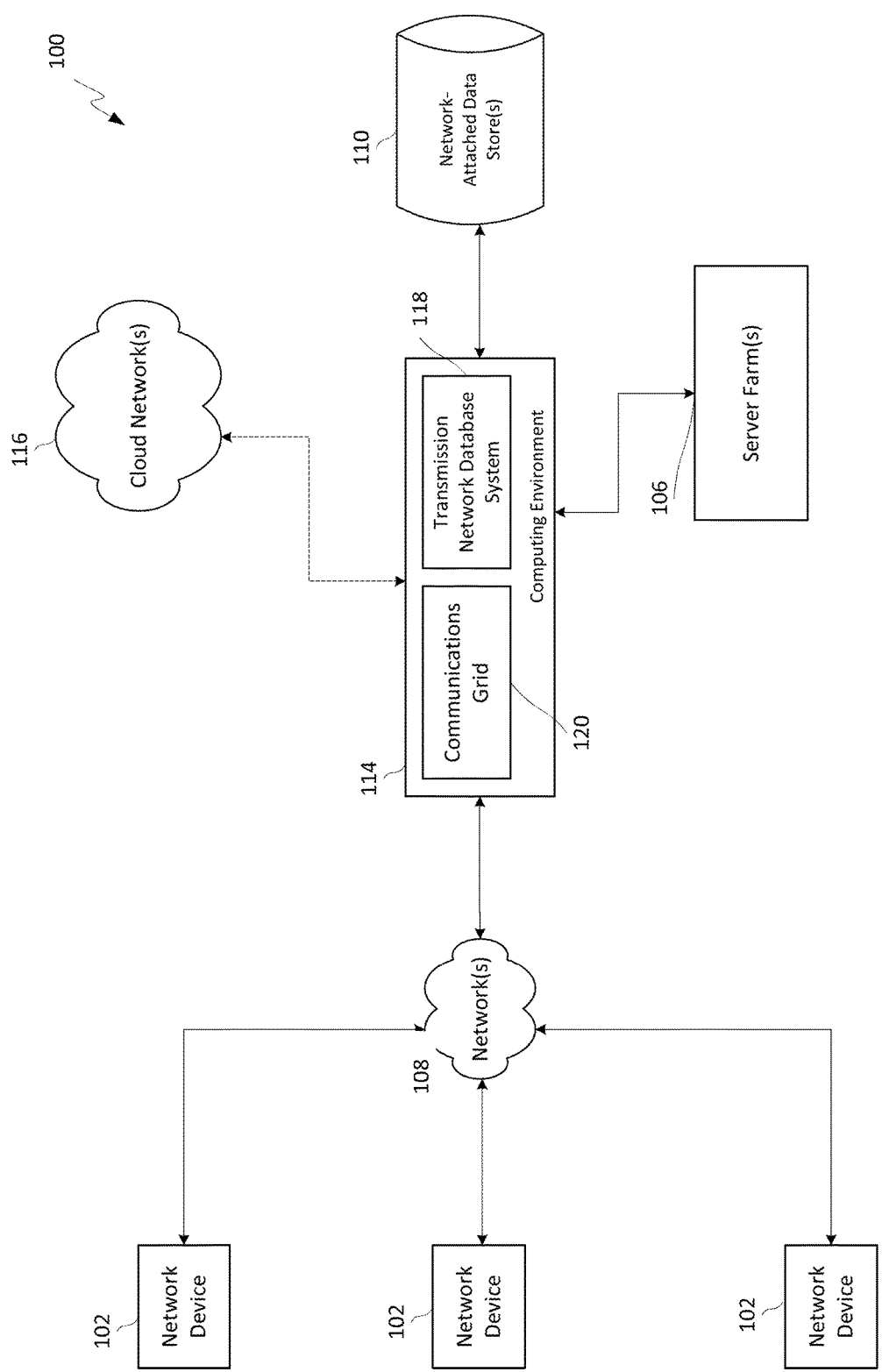
FIG. 1 illustrates a block diagram that provides an illustration of the hardware components of a computing system, according to some embodiments of the present technology.

Various embodiments are generally directed to decentralized load balancing in a host cluster utilized to coordinate performance of tasks in a workload, such as via service agents and/or host instances included in the host cluster, for instance. Some embodiments are particularly directed to a set of service agents on one or more host instances that utilize a shared cache to coordinate among themselves to balance a workload with no centralized controller or balancer. In one or more embodiments, a set of service agents may automatically balance a workload among themselves using a shared cache. In one or more such embodiments, the set of service agents may balance a workload among themselves by reading and/or writing to a data structure in the shared cache. For example, the set of service agents may balance the workload in response to one or more of a change in the number of host instances or service agents, failure of a service agent, and excessive time for completion of a task. In some embodiments, the load, or task queue, of each host instance and/or service agent in a host cluster may be balanced such that a busier component will release tasks to other less busy components. These and other embodiments are described and claimed.

Some challenges facing load balancing among components of a host cluster include the inability to balance a load without a centralized controller or balancer to coordinate service agents (also referred to as agents) on the host instances. This inability to balance a load without a centralized controller may result in the system having a single point of failure. For instance, all work may be received, distributed, and/or balanced by a centralized controller. In such instances, the centralized controller may be a single point of failure such that if the centralized controller fails, the entire system fails. These challenges may result in systems with reduced availability and limited adaptability. Adding further complexity, reliable execution of a variety of types of tasks with different processing requirements may be critical. For example, the tasks may be associated with monitoring the health of a software system. In some embodiments, performance tasks in a workload may be slow or unresponsive due to limited availability of service agents, resulting in poor utilization of processing capabilities of a system. Such limitations can drastically reduce the usability, applicability, and performance of host clusters, contributing to inefficient systems with limited flexibility and poor reliability.

Various embodiments described herein include a cluster of host instances (also referred to as service instances) that coordinate among themselves without a centralized controller or balancer. In one or more embodiments, this may enable the host cluster to achieve high availability without a single point of failure. In some embodiments, service agents running inside the host instances may automatically balance a workload among themselves using a shared cache. In some such embodiments, the service agents running inside the host instances may automatically balance the workload when there is a change in the number of host instances or service agents, when a service agent fails, or when a service agent takes too long to complete a task. In many embodiments, service agents may include one or more metric collecting agents to monitor metrics associated with health of a software system. In many such embodiments, the metrics may include dynamic system attributes such as central processing unit (CPU) or memory usages. In one or more embodiments, data collected by service agents may be organized and/or presented to a user. In various embodiments, one or more data structures may be generated, maintained, and/or updated in a shared cache by service agents to coordinate distribution of a workload. In various such embodiments, the data structures may indicate one or more parameters associated with distribution and/or execution of tasks in the workload.

In one or more embodiments, the number and availability of service agents may vary based on workload demands. For example, service agents may periodically determine whether to begin to actively perform tasks in a workload based on data stored in a shared cache associated with performance of tasks in a workload. In such instances, the data may include a timestamp associated with performance of a task in a workload. In some embodiments, service agents may periodically determine whether to begin to actively perform tasks in a workload (e.g., transition from a sleep state to an active state) based on data stored in a shared cache associated with performance of tasks in a workload. For example, if a period of time elapsed since a timestamp in a shared cached exceeds a service threshold, a service agent may determine to transition from a sleep state to an active state.

In various embodiments, the number of active service agents (also referred to as active agents) on each host instance may be balanced. For instance, if one host instance implements two active agents and another host instance implements no active agents, the system may be rebalanced such that each host instance has one active agent. In many embodiments, one or more agents, host instances, or task types may be weighted differently when balancing a workload. In some embodiments, distribution of tasks and/or resources among host instances may be dynamically controlled. In some such embodiments, the amount of each type of service agents implemented by or the portions of tasks assigned to each host instance may be determined based on weighting conditions.

In many embodiments, the weighting conditions may include a weight associated with or assigned to each host instance in a cluster. In one or more embodiments, a weight may indicate a rating of resources available to a host instance. In one or more such embodiments, the rating may be relative to other host instances in a host cluster. In various embodiments, the weighting conditions may be based on processing capabilities of hardware resources available to respective host instances. In various such embodiments, this may enable better utilization of host instances in a cluster. For instance, if a first host instance has a greater weight than a second host instance, a workload may be balanced such that the first host instance, or service agent(s) implemented thereon, receive a larger portion than the second host instance, or service agent(s) implemented thereon. In some instances, more service agents may be implemented on a host instance with a greater weight than host instances with less weight. Similarly, in various embodiments, requirements of different tasks or their frequency may be factored into how a workload is distributed.

In one or more embodiments, different resources may be provisioned to various service agents. In some embodiments, capabilities of different host instances, such as the capabilities of underlying hardware, may be utilized to determine a weight associated with a respective host instance. In some such instances, the capabilities of different host instances may thereby be factored into how a workload is distributed. For instance, if a first host instance has greater processing capabilities than a second host instance, a workload may be balanced such that the first host instance, or service agent(s) implemented thereon, receive a larger portion than the second host instance, or service agent(s) implemented thereon.

In these and other ways, the host cluster may enable customized, efficient, and reliable distribution of workloads to provide a system with improved capacity and increased availability, resulting in several technical effects and advantages. In various embodiments, the components of the host cluster may be implemented via one or more computing devices, and thereby provide additional and useful functionality to the one or more computing devices, resulting in more capable and better functioning computing devices. For example, the host cluster may be able to distribute workloads in a decentralized manner, resulting in a task execution without a single point of failure.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a selfconsistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
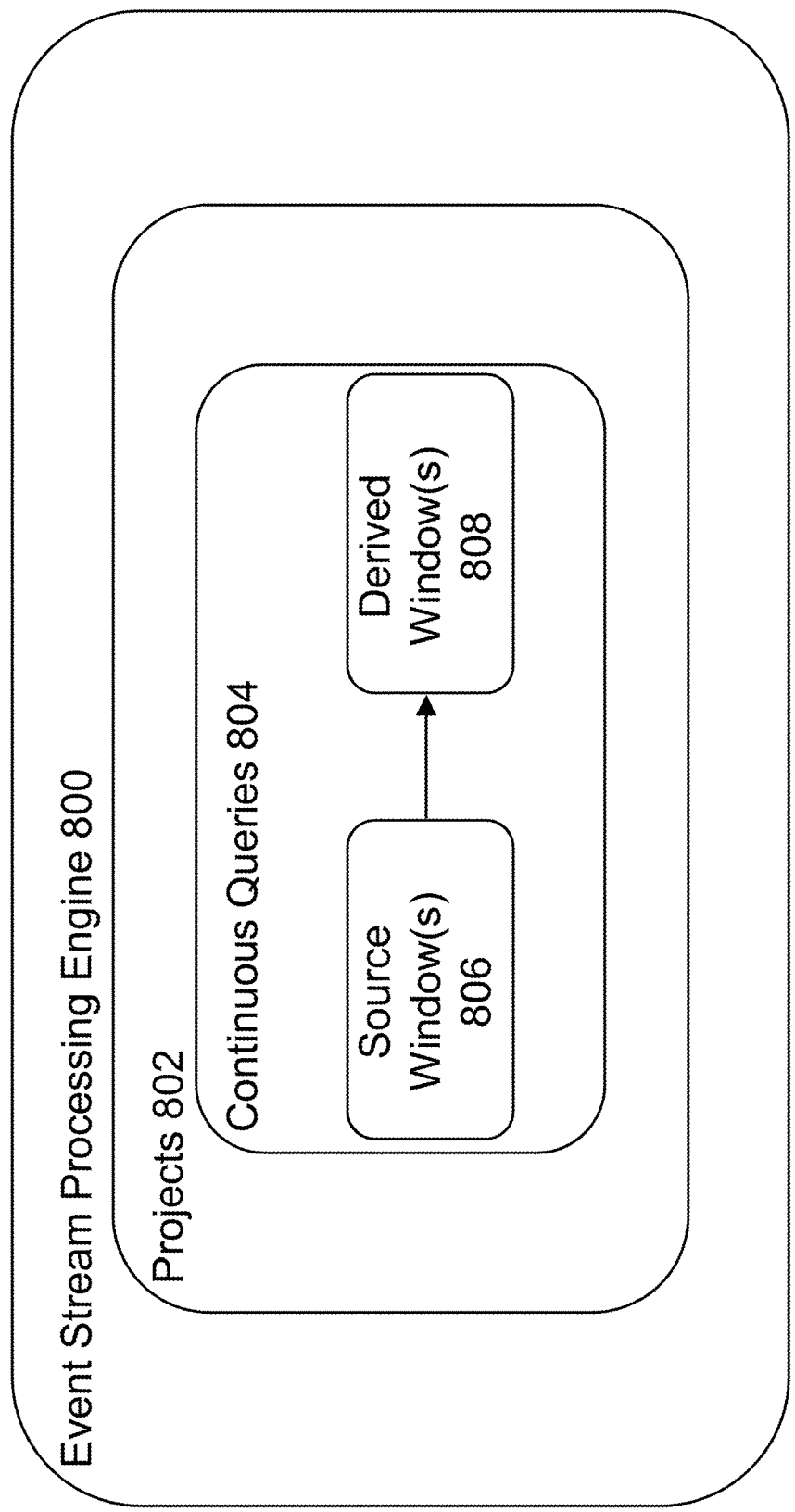
FIG. 8 illustrates a block diagram including components of an Event Stream Processing Engine (ESPE), according to embodiments of the present technology.
Figure 9:
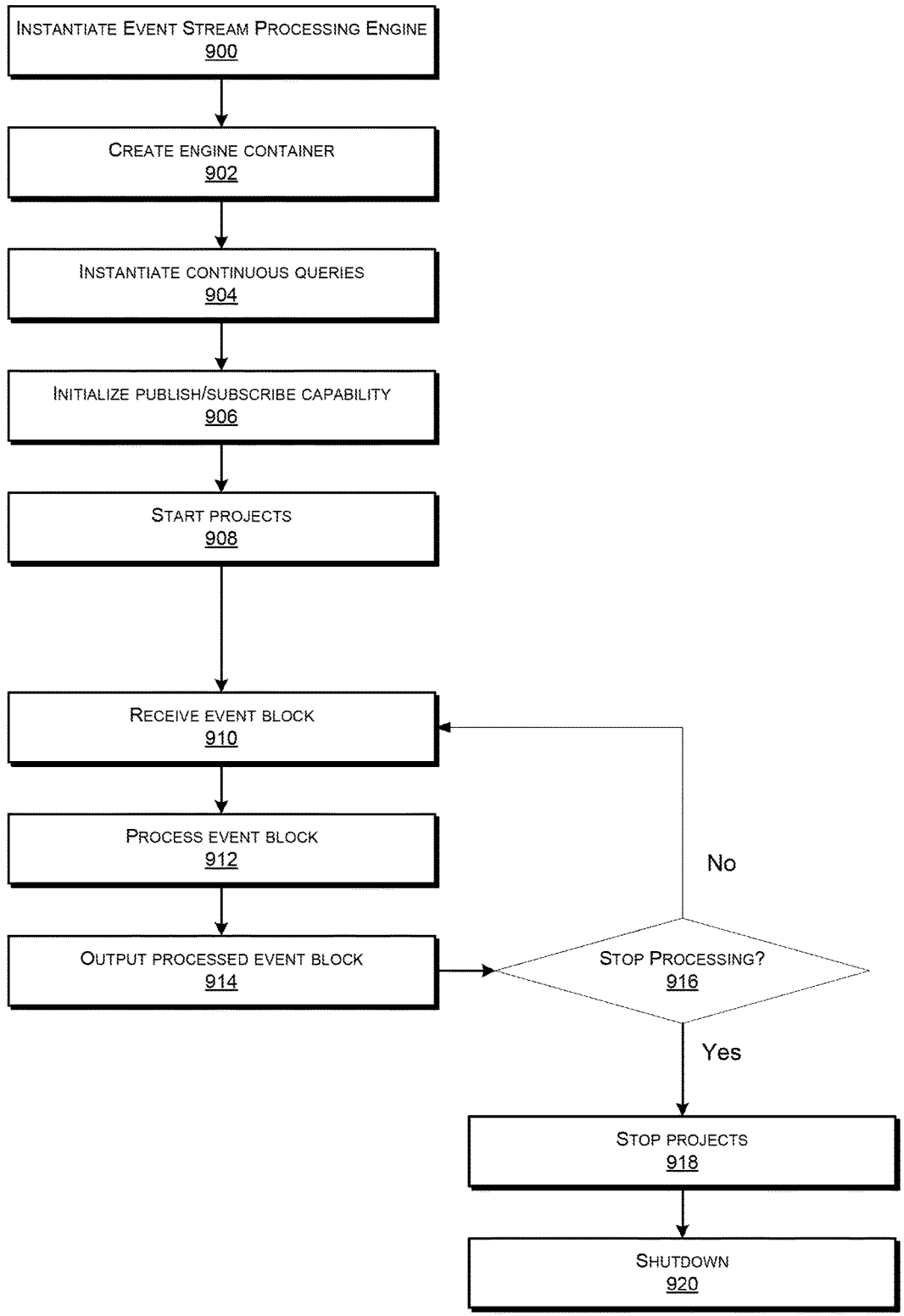
FIG. 9 illustrates a flow chart showing an example process including operations performed by an event stream processing engine, according to some embodiments of the present technology.
Figure 10:
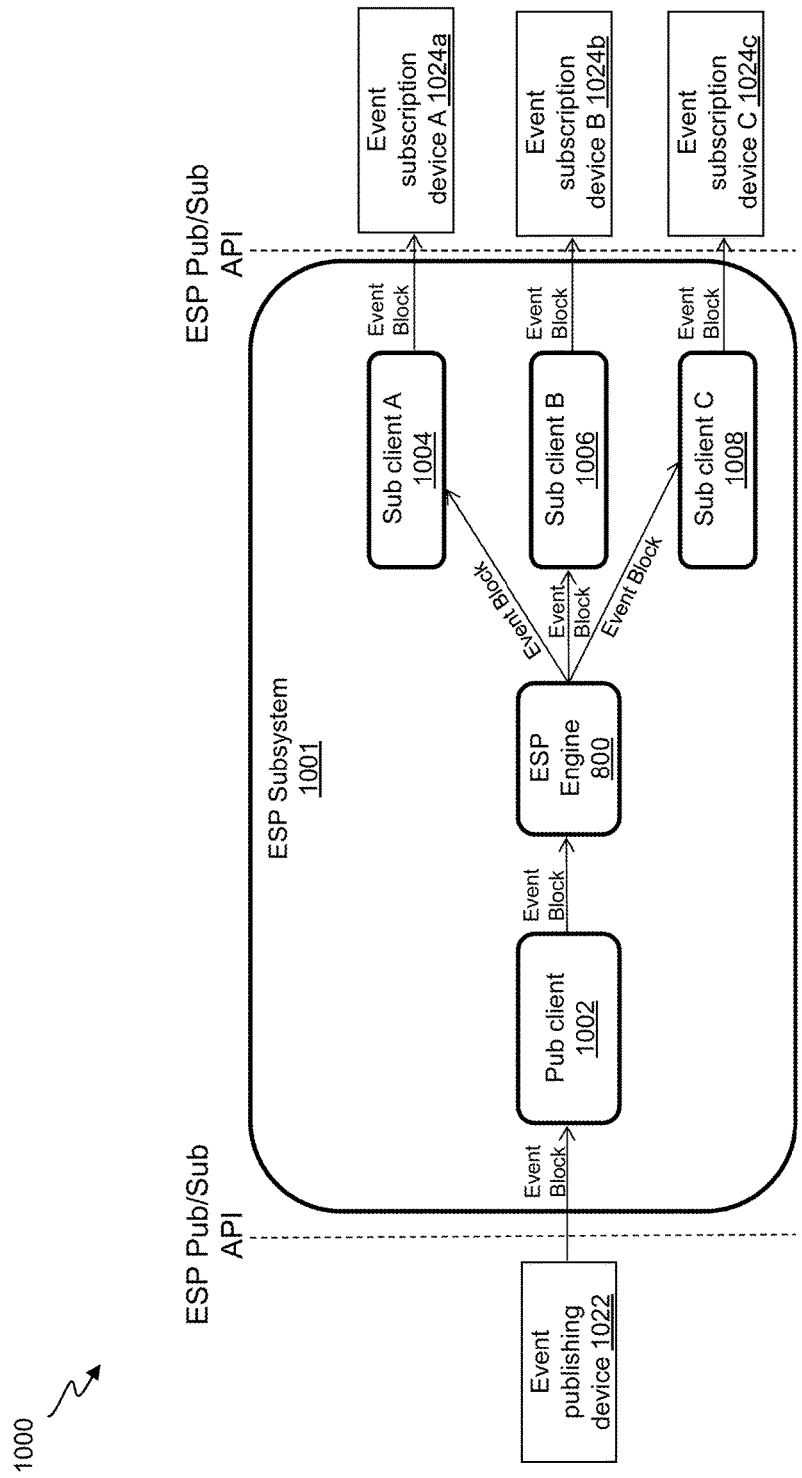
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
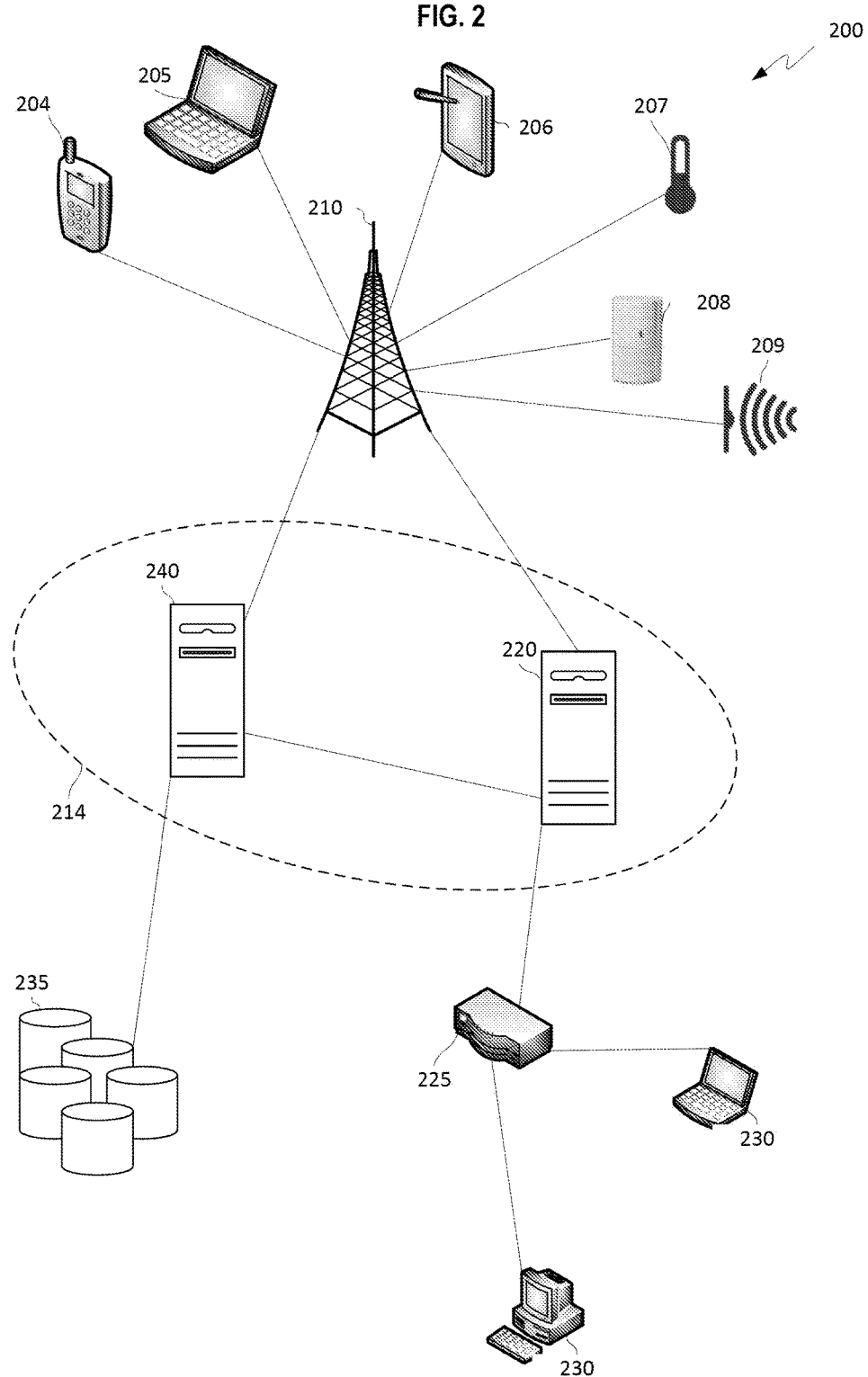
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
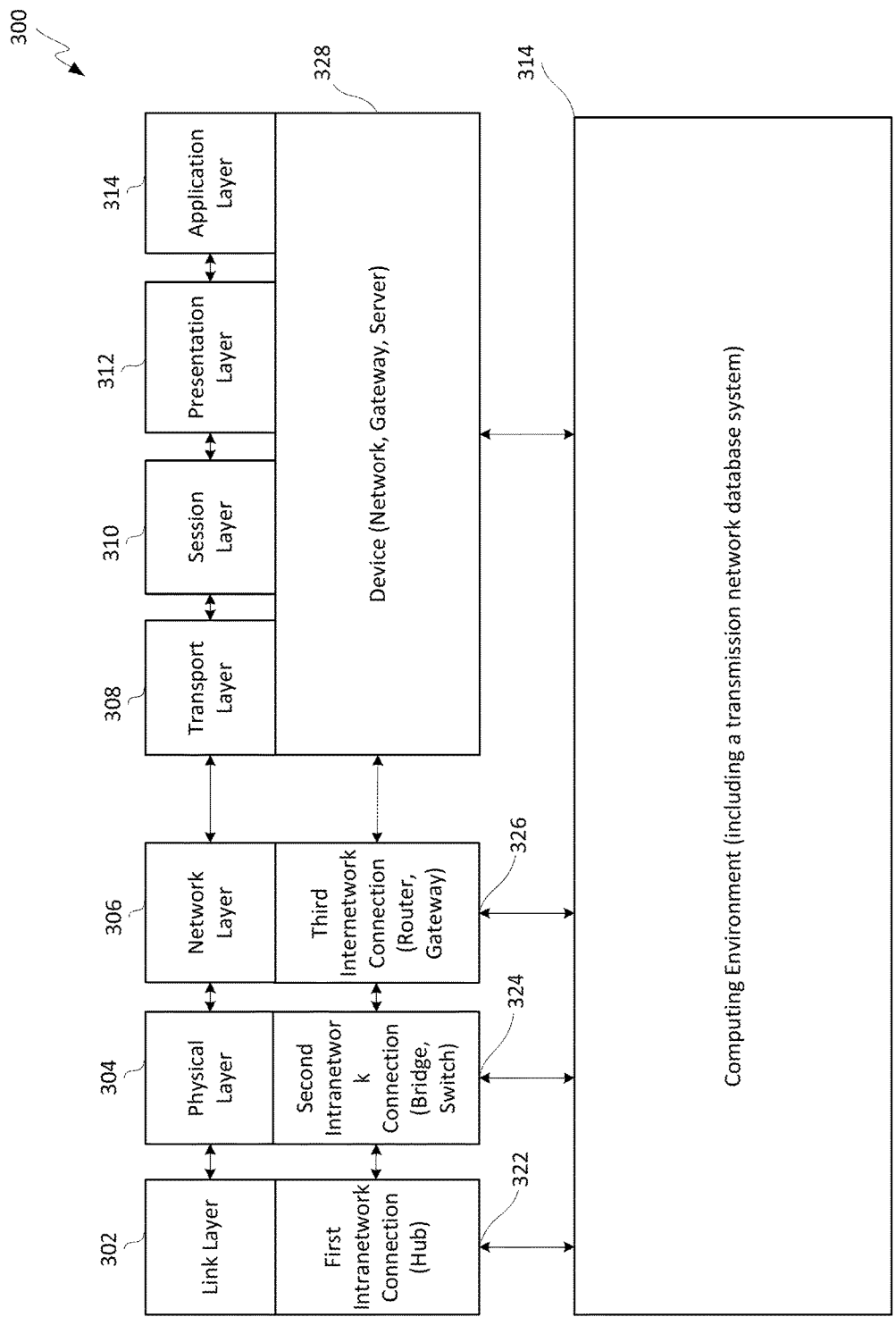
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
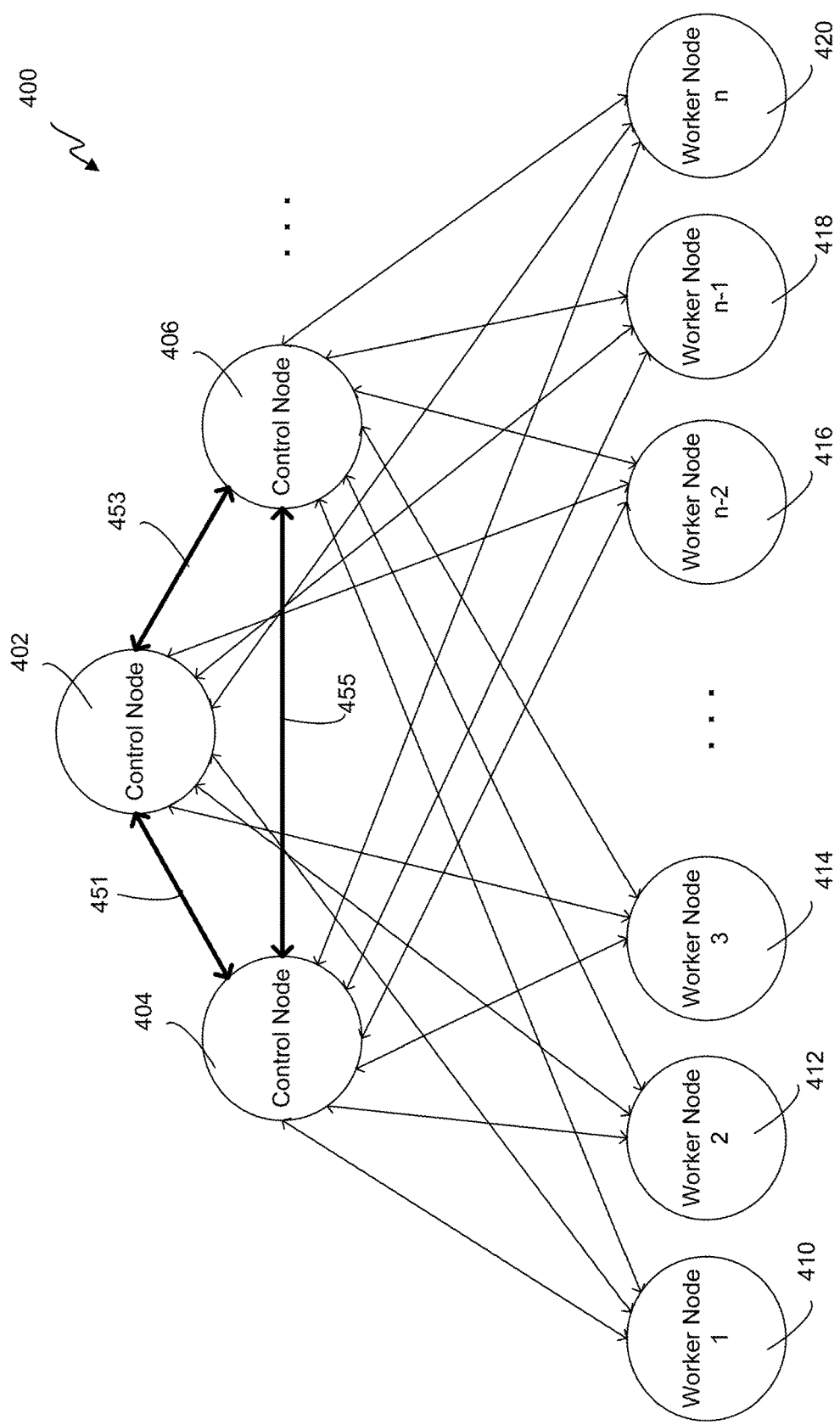
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
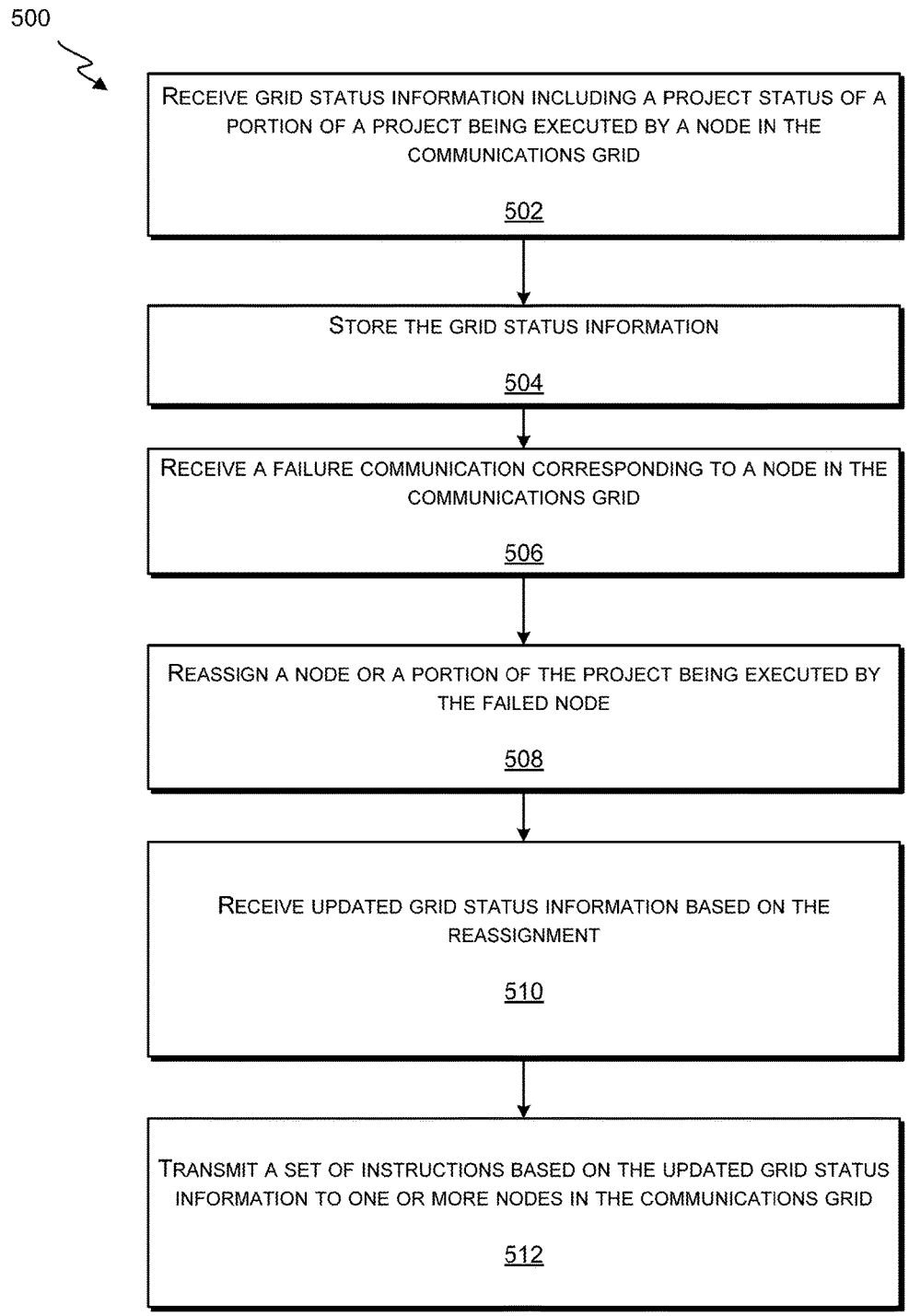
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
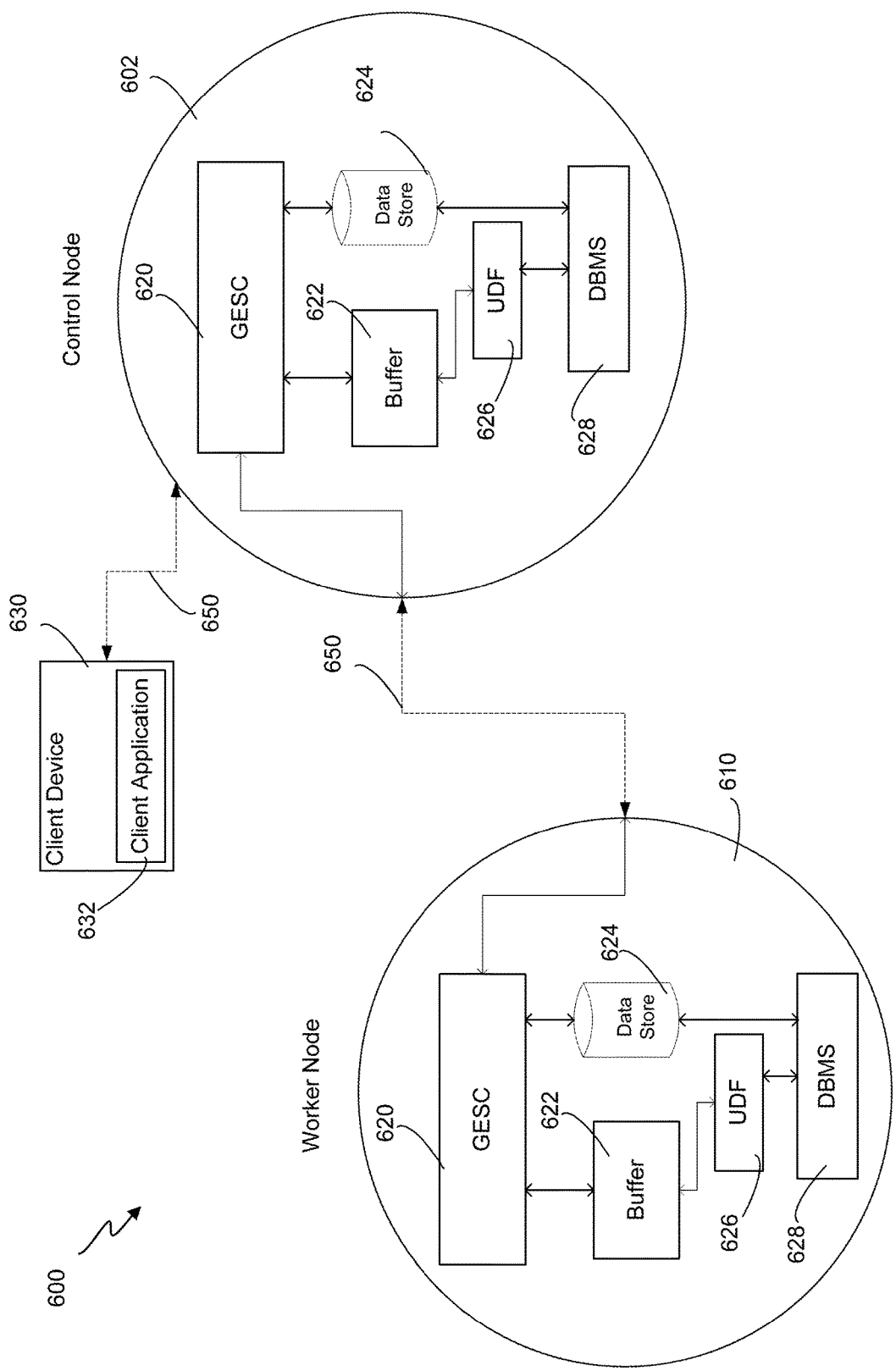
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
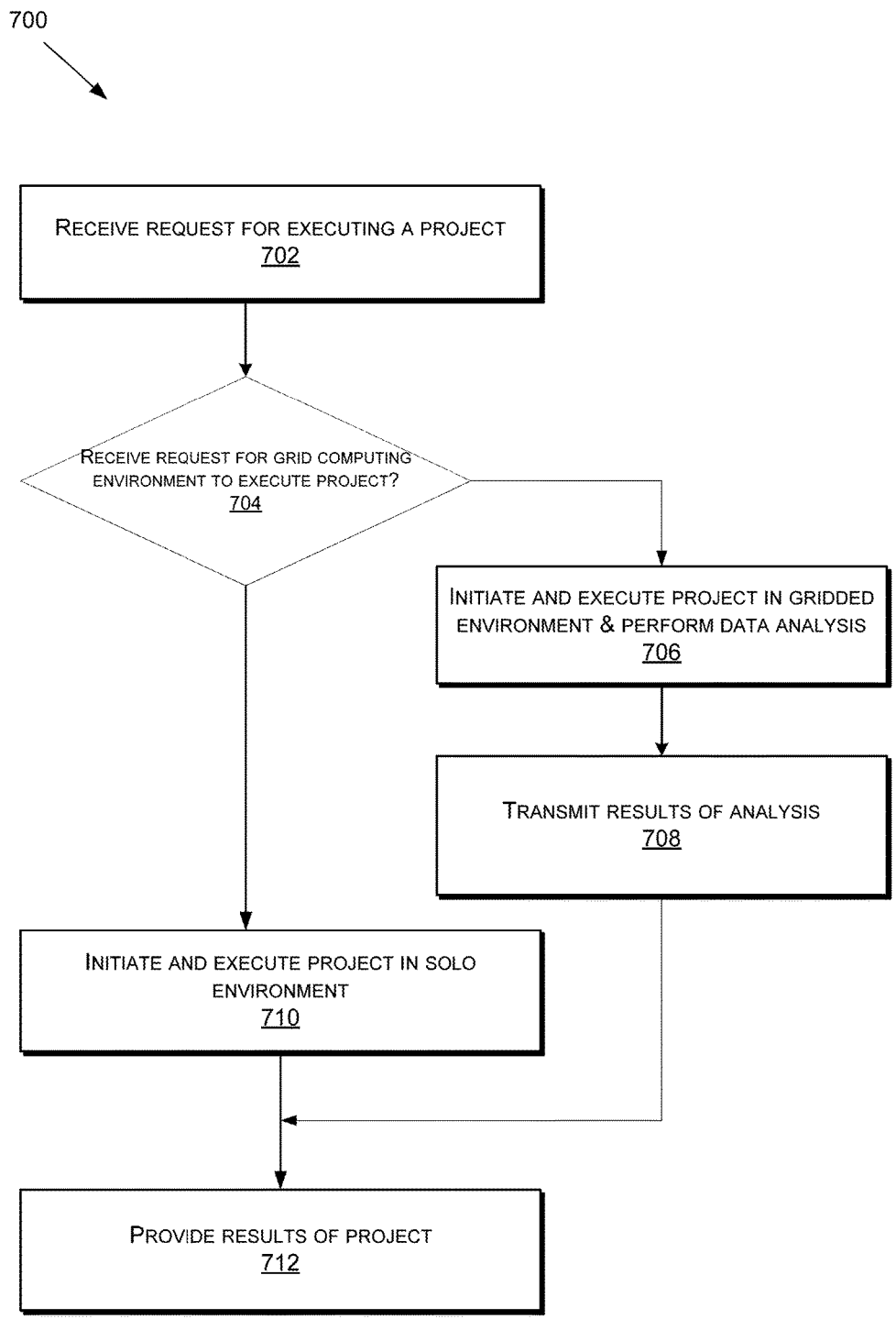
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874*c*. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874*a*, event subscribing device B 874*b*, and event subscribing device C 874*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874*a*, event subscribing device B 874*b*, and event subscribing device C 874*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874*a* using the publish/subscribe API. Subscribing client B 856 may be started by an event subscription application B executing at event subscribing device B 874*b* using the publish/subscribe API. Subscribing client C 858 may be started by an event subscription application C executing at event subscribing device C 874*c* using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874*a*, event subscription device B 874*b*, and event subscription device C 874*c*. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874*a-c*. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
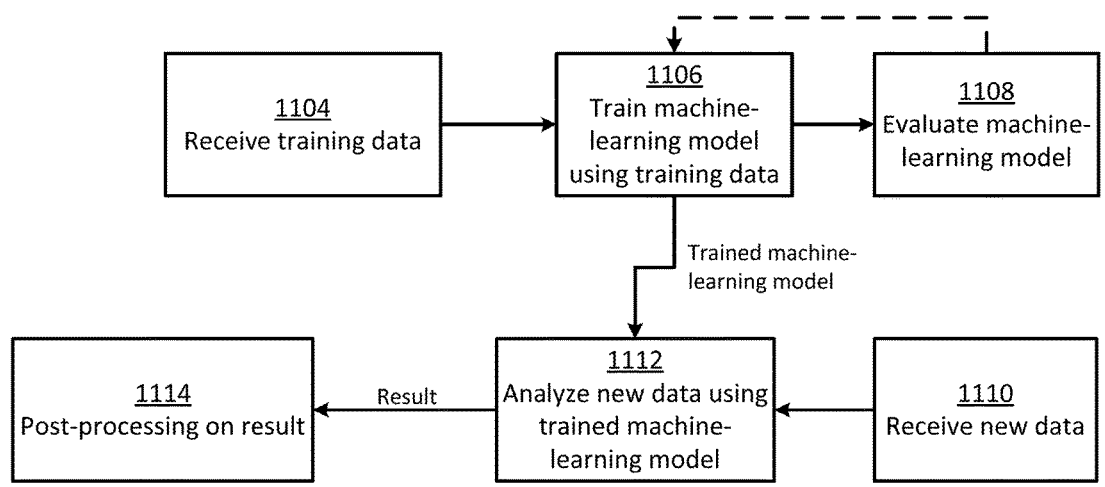
FIG. 11A illustrates a flow chart showing an example process for generating and using a machine-learning model, according to some embodiments of the present technology.

FIG. 11A is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11A.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 11B:
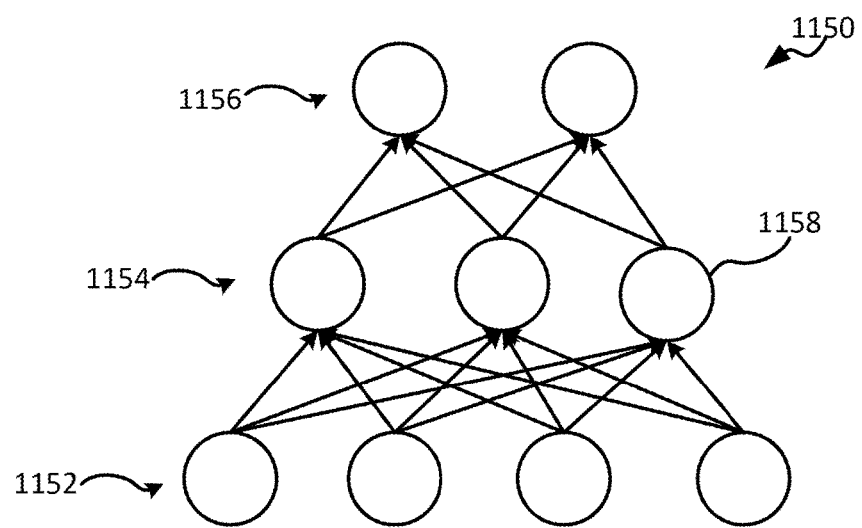
FIG. 11B illustrates a neural network including multiple layers of interconnected neurons, according to some embodiments of the present technology.

A more specific example of a machine-learning model is the neural network 1150 shown in FIG. 11B. The neural network 1150 is represented as multiple layers of interconnected neurons, such as neuron 1158, that can exchange data between one another. The layers include an input layer 1152 for receiving input data, a hidden layer 1154, and an output layer 1156 for providing a result. The hidden layer 1154 is referred to as hidden because it may not be directly observable or have its input directly accessible during the normal functioning of the neural network 1150. Although the neural network 1150 is shown as having a specific number of layers and neurons for exemplary purposes, the neural network 1150 can have any number and combination of layers, and each layer can have any number and combination of neurons.

The neurons and connections between the neurons can have numeric weights, which can be tuned during training. For example, training data can be provided to the input layer 1152 of the neural network 1150, and the neural network 1150 can use the training data to tune one or more numeric weights of the neural network 1150. In some examples, the neural network 1150 can be trained using backpropagation. Backpropagation can include determining a gradient of a particular numeric weight based on a difference between an actual output of the neural network 1150 and a desired output of the neural network 1150. Based on the gradient, one or more numeric weights of the neural network 1150 can be updated to reduce the difference, thereby increasing the accuracy of the neural network 1150. This process can be repeated multiple times to train the neural network 1150. For example, this process can be repeated hundreds or thousands of times to train the neural network 1150.

In some examples, the neural network 1150 is a feed-forward neural network. In a feed-forward neural network, every neuron only propagates an output value to a subsequent layer of the neural network 1150. For example, data may only move one direction (forward) from one neuron to the next neuron in a feed-forward neural network.

In other examples, the neural network 1150 is a recurrent neural network. A recurrent neural network can include one or more feedback loops, allowing data to propagate in both forward and backward through the neural network 1150. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1150 operates by receiving a vector of numbers from one layer; transforming the vector of numbers into a new vector of numbers using a matrix of numeric weights, a nonlinearity, or both; and providing the new vector of numbers to a subsequent layer of the neural network 1150. Each subsequent layer of the neural network 1150 can repeat this process until the neural network 1150 outputs a final result at the output layer 1156. For example, the neural network 1150 can receive a vector of numbers as an input at the input layer 1152. The neural network 1150 can multiply the vector of numbers by a matrix of numeric weights to determine a weighted vector. The matrix of numeric weights can be tuned during the training of the neural network 1150. The neural network 1150 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1154, of the neural network 1150. The subsequent layer of the neural network 1150 can receive the transformed output, multiply the transformed output by a matrix of numeric weights and a nonlinearity, and provide the result to yet another layer of the neural network 1150. This process continues until the neural network 1150 outputs a final result at the output layer 1156.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide(GaAs)) devices.

According to embodiments discussed herein, the above-described computing devices and systems may be utilized to implement one or more components of a host cluster, such as host instances, service agents, and a shared cache, to distribute workloads in a decentralized manner. In many embodiments, this may enable a system to provide high availability and no single point of failure. The components of the host cluster may be used to quickly and efficiently distribute and execute tasks of a workload, resulting in a computing device and/or system with exclusive and advantageous capabilities. For example, distributing workloads via a shared cache may improve performance and reliability of processing tasks in a workload.

In some embodiments, the above-described computing devices and systems may implement a service agent that collectively operate to distribute workloads via a shared cache to achieve a decentralized load balancing system. In various embodiments, the workloads may be distributed based on a customizable and dynamic scheme. For instance, the distribution of a workload may factor in one or more parameters and/or settings associated with one or more components of the host cluster. In one or more embodiments, the number and availability of service agents may vary based on workload demands. For example, service agents may periodically determine (e.g., based on a timer) whether to begin to actively perform tasks in a workload based on data stored in a shared cache associated with performance of tasks in a workload. In some such examples, the period of time between determining whether to begin actively performing tasks in the workload may be referred to as a service interval. In various examples, the service interval may include the time an active agent performs a task, goes to sleep, and wakes up again to perform another task. In some embodiments, the number of each type of service agent in a host instance and/or the resources allocated to the host instance may be controlled. In various embodiments, the number of active service agents (also referred to as active agents) on each host instance may be balanced. For instance, if one host instance implements two active agents and another host instance implements no active agents, the system may be rebalanced such that each host instance has one active agent. In some embodiments, capabilities of different host instances, such as the capabilities of underlying hardware, may be factored into how a workload is distributed. For instance, if a first host instance has greater processing capabilities than a second host instance, a workload may be balanced such that the first host instance, or service agent(s) implemented thereon, receive a larger portion than the second host instance, or service agent(s) implemented thereon. These and other features described herein may enable a computing device and/or system implementing one or more components of a host cluster to realize unique and advantageous functionalities, resulting in an improved computer.

Figure 12:
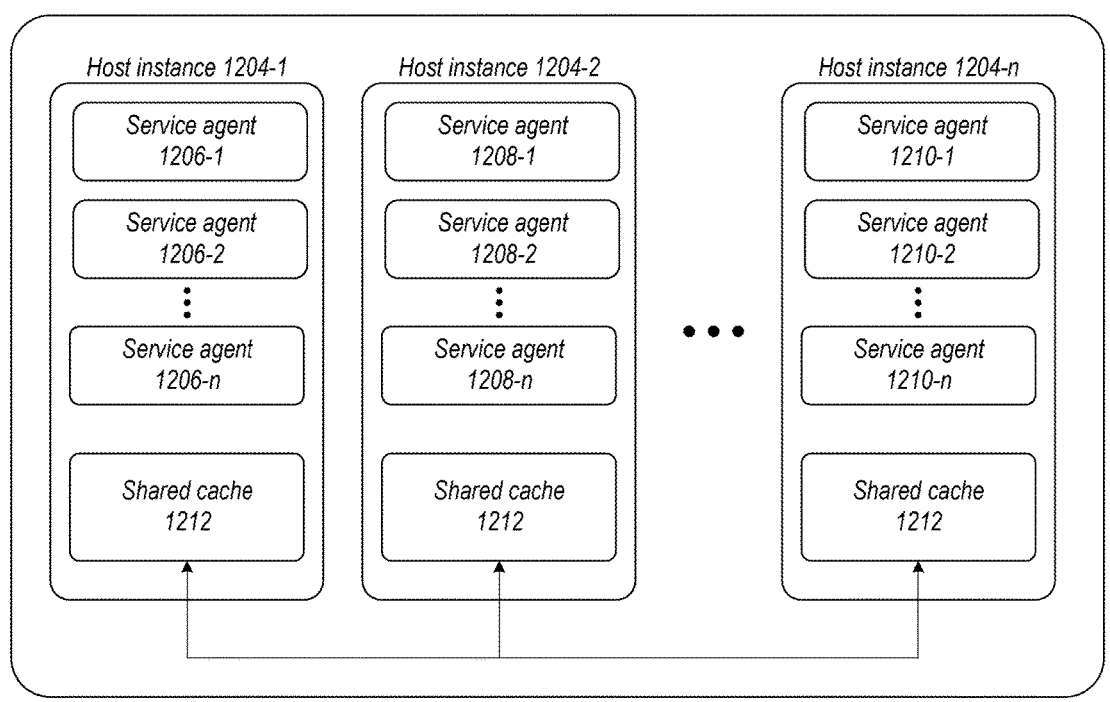
FIG. 12 illustrates an operating environment for an exemplary host cluster, according to some embodiments of the present technology.

FIG. 12 illustrates an example of an operating environment 1200 that may be representative of various embodiments. In operating environment 1200, a host cluster 1202 may include one or more host instances 1204-1, 1204-2, 1204-n (also referred to as host instances 1204). In many embodiments, the host instances 1204 in the host cluster 1202 may operate to process various tasks in a workload. For example, the tasks may be related to monitoring the health of a software system. In various embodiments described herein, each of the host instances 1204 may implement one or more service agents 1206, 1208, 1210 that perform decentralized load balancing via a shared cache 1212. For instance, the service agents may generate, monitor and/or update one or more data structures in the shared cache 1212. In such instances, the data structure in the shared cache 1212 may identify parameters associated with distribution and/or execution of tasks in a workload. In various embodiments, host instances may each locally maintain a synchronized copy of the shared cached 1212. Embodiments are not limited in this context.

In some embodiments, the host cluster 1202 may have multiple host instances or service agents sharing a set of resources (e.g., multiple software components running on a single host). Some embodiments may be designed to ensure at least one service agent of each type is always available to perform tasks of that type. In one or more embodiments, to achieve high availability, multiple instances of hosts may each include a set of service agents. In one or more such embodiments, the number and type of each service agent on each host instance 1204 may be controlled to ensure back-up service agents are available to step in and provide services (e.g., perform tasks). In some embodiments, a host cluster 1202 may include one or more types of service agents. In one or more embodiments, the load of each host instance, or service agents, may be balanced so that a busier host instance can release at least part of their workload to other host instances that are less busy. In various embodiments, distribution of tasks may be weighted. In various such embodiments, the weight may be defined based on application. For instance, depending on the processing resources needed for each type of task, each type of task may be assigned a weight. In further such instances, retrieving CPU usage may have a weight of one while retrieving database metrics may have a weight of three because it requires more load than retrieving CPU usage. In some embodiments, the weight of each application type may be based on one or more of empirical and theoretical calculations.

In one or more embodiments, service agents may negotiate among themselves to determine which agent(s) from which host(s) should perform tasks (as an active agent) and which agent(s) should return to a sleep state. In one or more embodiments, once an active agent performs a task it may update the shared cache 1212 with a corresponding timestamp. In one or more such embodiments, the timestamp, together with other agent info, such as a host name, may comprise a monitoring status of a particular agent type. In various embodiments, when a timestamp exceeds a service threshold (e.g., predetermined time interval) or one host instance has too many active agents, a secondary agent may transition from a sleep state to an active state to achieve dynamic failover and load balancing. For example, the service threshold may include a time equal to twice a service interval. In such examples, the service interval may include an amount of time between initialization of a timer and expiration of the timer.

In some embodiments, the secondary agent may establish itself as an active agent in the shared cache 1212. In some such embodiments, establishing the secondary agent as the active agent may cause another agent to transition from an active state to a sleep state. In some embodiments, capabilities of different host instances, such as the capabilities of underlying hardware, may be factored into how a workload is distributed. For instance, if a first host instance has greater processing capabilities than a second host instance, a workload may be balanced such that the first host instance, or service agent(s) implemented thereon, receive a larger portion than the second host instance, or service agent(s) implemented thereon.

In various embodiments described herein, operation of one or more service agents in a host cluster may include one or more of the following operations described with respect to host cluster 1202 and one or more components thereof. In some embodiments, a first timer associated with service agent 1206-1 of the set of service agents implemented by host instance 1204-1. In some such embodiments, service agent 1206-1 may awake in response to expiration of the first timer. In one or more embodiments, service agent 1206-1 may determine, via a local copy of shared cache 1212 that agent 1206 is not an active agent associated with a first task type. In various embodiments, service agent 1206-1 may identify a value of a first timestamp in shared cache 1212 associated with performance of a task of the first task type by service agent 1208-1 of host instance 1204-2 as an active agent.

In some embodiments, service agent 1206-1 may determine a time elapsed between the value of the first timestamp and a current time. In embodiments in which service agent 1206-1 determines the time elapsed since the first timestamp exceeds a service threshold, service agent 1206-1 may update shared cache 1212 to indicate it is an active agent for the service or task type and/or update the value of the first timestamp. In some embodiments, service agent 1206-1 may identify a number of active agents associated with host instance 1204-2 when the time elapsed is below the service threshold. In some such embodiments, the service threshold may include a maximum amount of time between performance of two tasks of the same task type to maintain a target service level.

In various embodiments, service agent 1206-1 of host instance 1204-1 may enter a sleep state when the number of active agents associated with host instance 1204-2 is below a load difference threshold. In various such embodiments, the load difference threshold may include a maximum difference between the number of service agents in the active state on host instance 1204-2 and host instance 1204-1. In one or more embodiments, when the number of active agents associated with the host instance 1204-2 is above the load difference threshold, service agent 1206-1 of host instance 1204-1 may replace a service agent on host instance 1204-2 with itself, as an active agent for the first task type in shared cache 1212. In one or more such embodiments, this may reduce the number of service agents in the active state implemented by host instance 1204-2, thereby balancing the workload. In some embodiments, service agent 1206-1 may subsequently update the value of the first timestamp and perform a task of the first task type in response to being a service agent in the active state for the first task type.

Figure 13A:
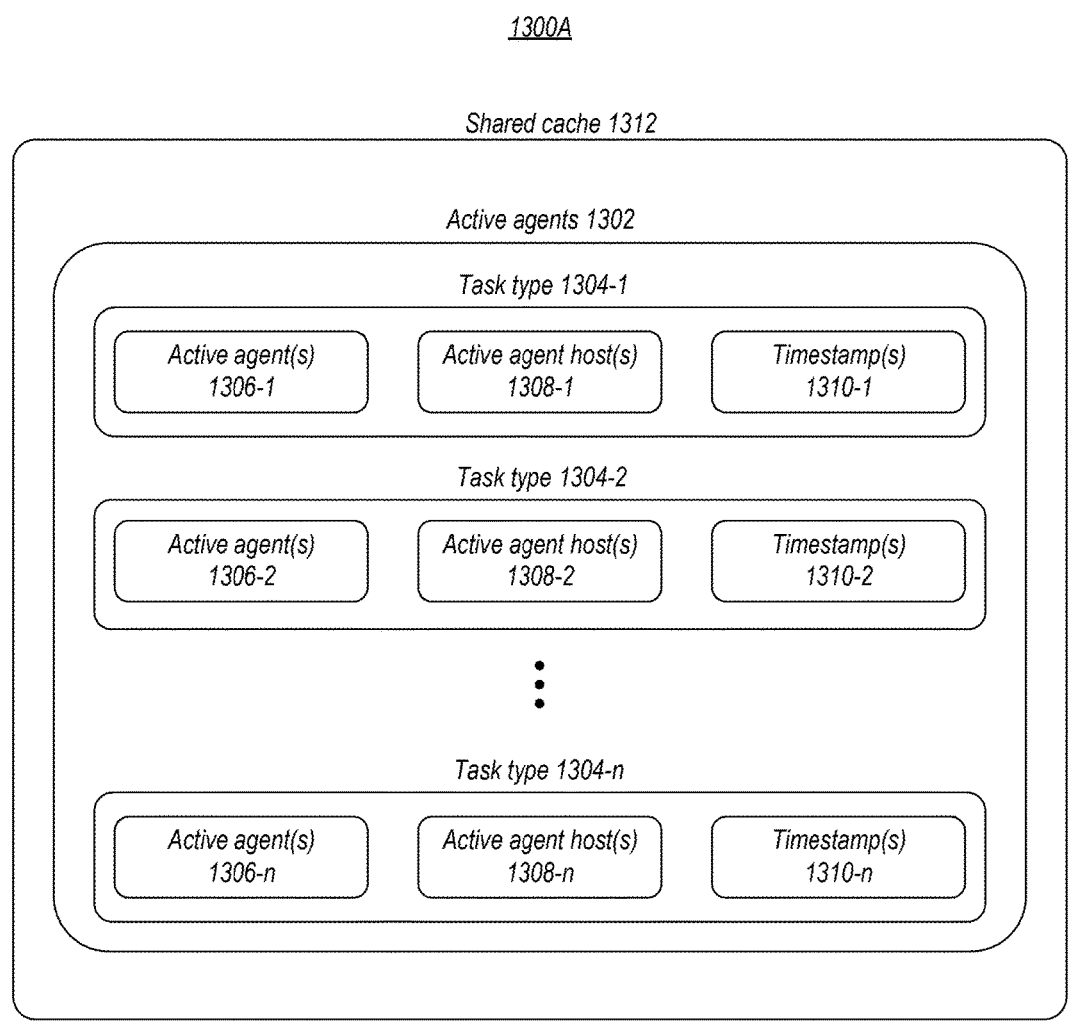

FIGS. 13A and 13B illustrate examples of operating environments 1300A, 1300B that may be representative of various embodiments. Operating environment 1300A may include shared cache 1312 and operating environment 1300B may include shared cache 1362. In many embodiments, shared cache 1212 may be the same or similar to one or more of shared caches 1312, 1362. In one or more embodiments described herein, service agents in a host cluster may generate, monitor, and/or update one or more data structures that are conceptually the same or similar to those illustrated in one or more of shared caches 1312, 1362 to perform decentralized load balancing. In various embodiments, a data structure may refer to the organization of data to suit a specific purpose (e.g., decentralized load distribution) such that the data can be accessed and worked with in appropriate ways. In some embodiments, the data structures may indicate one or more parameters associated with distribution and/or execution of tasks in a workload. In operating environment 1300A, shared cache 1312 may include a data structure for active agents 1302. In operating environment 1300B, shared cache 1362 may include data structures for active agents 1352 and a data structure for a task queue 1365. Embodiments are not limited in this context.

Referring to FIG. 13A, the active agents 1302 data structure may include an entry for one or more different task types 1304-1, 1304-2, 1304-n (also referred to as task types 1304) associated with a workload. In various embodiments, a task type may include any type of task that is repeated periodically, such as retrieving one or more of metric data of resources, component availability, a process log, and the like. In many embodiments, each task type may include a monitoring status for a particular agent type. In many such embodiments, the monitoring status may include one or more time stamps together with active agent and/or active agent host info. In some embodiments, each task type may include an indication of one or more active agents associated with the respective task type. For example, task type 1304-1 may include an indication of one or more active agents 1306-1 associated with task type 1304-1, such as one or more of service agents 1206, 1208, 1210.

In various embodiments, each task type may include an indication of one or more active agent hosts associated with the respective task type. In various such embodiments, active agent hosts may refer to one or more of host instances 1204 that have one or more active service agents associated with a respective task type. For instance, task type 1304-1 may include an indication of one or more active agent hosts 1308-1 associated with task type 1304-1, such as one or more of host instances 1204. In many embodiments, each task type may include one or more timestamps 1310 associated with the respective task type. In such embodiments, the timestamps may indicate when a task of the respective task type was last performed. For example, whenever an active agent performs a task, it may update the respective timestamp in the shared cache.

Referring to FIG. 13B, the active agents 1352 data structure may include an entry for one or more different task types 1354-1, 1354-2, . . . 1354-n (also referred to as task types 1354) associated with a workload. In the illustrated embodiment, the workload may comprise task queue 1365. In various embodiments, each task type may include indications of one or more active agents associated with the respective task type. In some embodiments, each indication of an active agent may also identify the host of the active agent. For example, the indication may include a unique identifier that identifies a service agent and its host instance. In one or more embodiments, the timestamps 1360 may be the same or similar to timestamps 1310.

In some embodiments, the task queue 1365 may include one or more tasks 1352-1, 1352-2, . . . 1352-n. For instance, the tasks 1352 may be associated with monitoring the health of a software system. In many embodiments, a workload may include the one or more tasks 1352 in task queue 1365. In one or more embodiments, each task 1352 in task queue 1365 may include an indication of type. In various embodiments, a shared cache may include one or more task queues. For example, a separate task queue may be provided for each type of task 1352-1. In such examples, the one or more task queues could be incorporated into active agents 1352 data structure, such as in respective task types 1354.

In one or more embodiments, host cluster 1202 may operate according to one or more preferences or weightings. In one or more such embodiments, the shared cache may include a data structure associated with the preferences or weightings. In various embodiments, the preferences or weights may be utilized to enable host cluster 1202 to operate in one or more of the following ways. In some embodiments, the number of active service agents on each host instance may be balanced. For instance, if one host instance implements two active agents and another host instance implements no active agents, the system may be rebalanced such that each host instance has one active agent.

In many embodiments, one or more agents, host instances, or task types may be weighted differently when balancing a workload. In some embodiments, distribution of tasks and/or resources among host instances may be dynamically controlled. In some such embodiments, the amount of each type of service agent implemented by, or the portions of tasks assigned to each host instance, may be determined based on one or more weighting conditions. For instance, if a first host instance has a greater weight than a second host instance, a workload may be balanced such that the first host instance, or service agent(s) implemented thereon, receive a larger portion than the second host instance, or service agent(s) implemented thereon. In some instances, more service agents may be implemented some host instances. Similarly, in various embodiments, requirements of different tasks or their frequency may be factored into how a workload is distributed.

In one or more embodiments, different resources may be provisioned to various service agents. In some embodiments, capabilities or processing capabilities of different host instances, such as the capabilities of underlying hardware, may be factored into how a workload is distributed. For instance, if a first host instance has greater processing capabilities than a second host instance, a workload may be balanced such that the first host instance, or service agent(s) implemented thereon, receive a larger portion than the second host instance, or service agent(s) implemented thereon. In such instances, greater processing capabilities may result from a host with one or more of a faster CPU, more CPU cores, or more memory.

In some embodiments, processing capabilities of hardware resources available to the first host instance may be compared to processing capabilities of hardware resources available to the second host instance to determine the load difference threshold. For example, if the processing capabilities of hardware resources available to the first host instance are equal to the processing capabilities of the hardware resources available to the second host, the load difference threshold may be determined to be zero. In another example, if the processing capabilities of hardware resources available to the first host instance are greater to the processing capabilities of the hardware resources available to the second host, the load difference threshold may be determined to be greater than zero. In yet another example, if the processing capabilities of hardware resources available to the first host instance are less than the processing capabilities of the hardware resources available to the second host, the load difference threshold may be determined to be less than zero.

Figure 14:
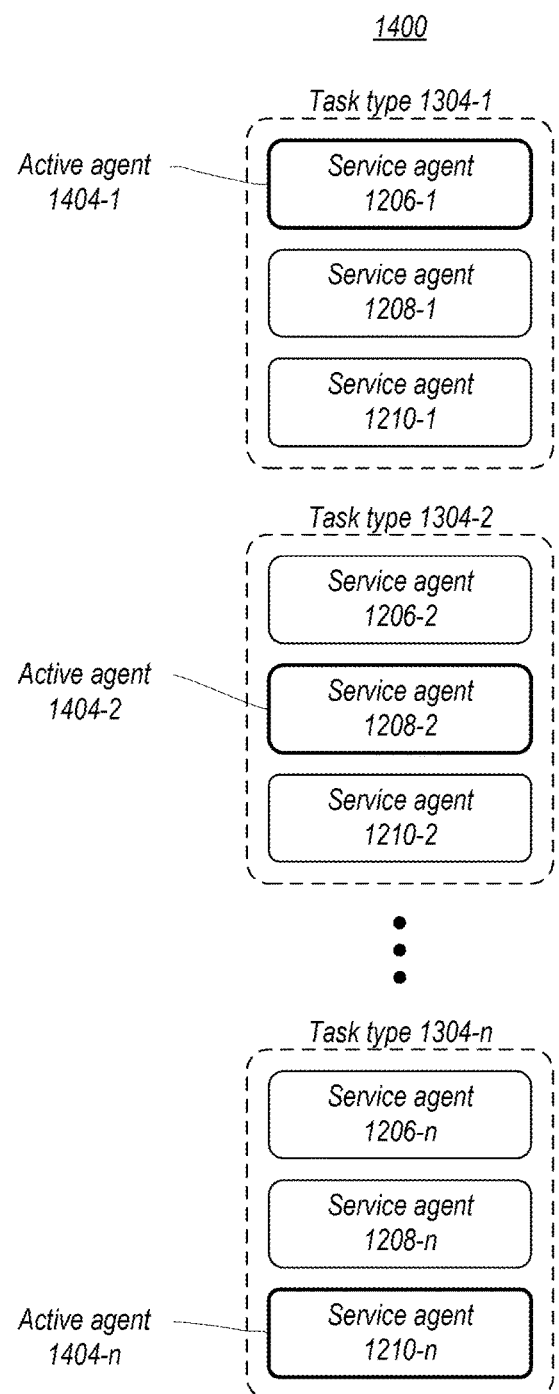
FIG. 14 illustrates an operating environment for exemplary service agents in a host cluster, according to some embodiments of the present technology.

FIG. 14 illustrates an example of an operating environment 1400 that may be representative of various embodiments. In operating environment 1400, service agents 1206, 1208, . . . 1210 of host cluster 1202 may be grouped according to the task type 1304 they perform. In one or more embodiments, an active agent 1404 may be associated with at least one service agent of each task type 1304. In some embodiments, shared cache 1212 may include a data structure that maps service agents and/or active agents 1404 by task type 1304. In one or more embodiments described herein, service agents may generate, monitor and/or update one or more data structures in the shared cache 1212 to coordinate with other service agents to determine one or more active agents for their respective task type. In one or more such embodiments, this may enable host cluster 1202 to perform decentralized load balancing. In various embodiments, service agents identified as active agents may be in or transition to an active state, and service agents not identified as active agents may be in or transition to a sleep state. In some embodiments, inactive agents may be either implicitly or explicitly identified in the shared cache. Embodiments are not limited in this context.

Figure 15:
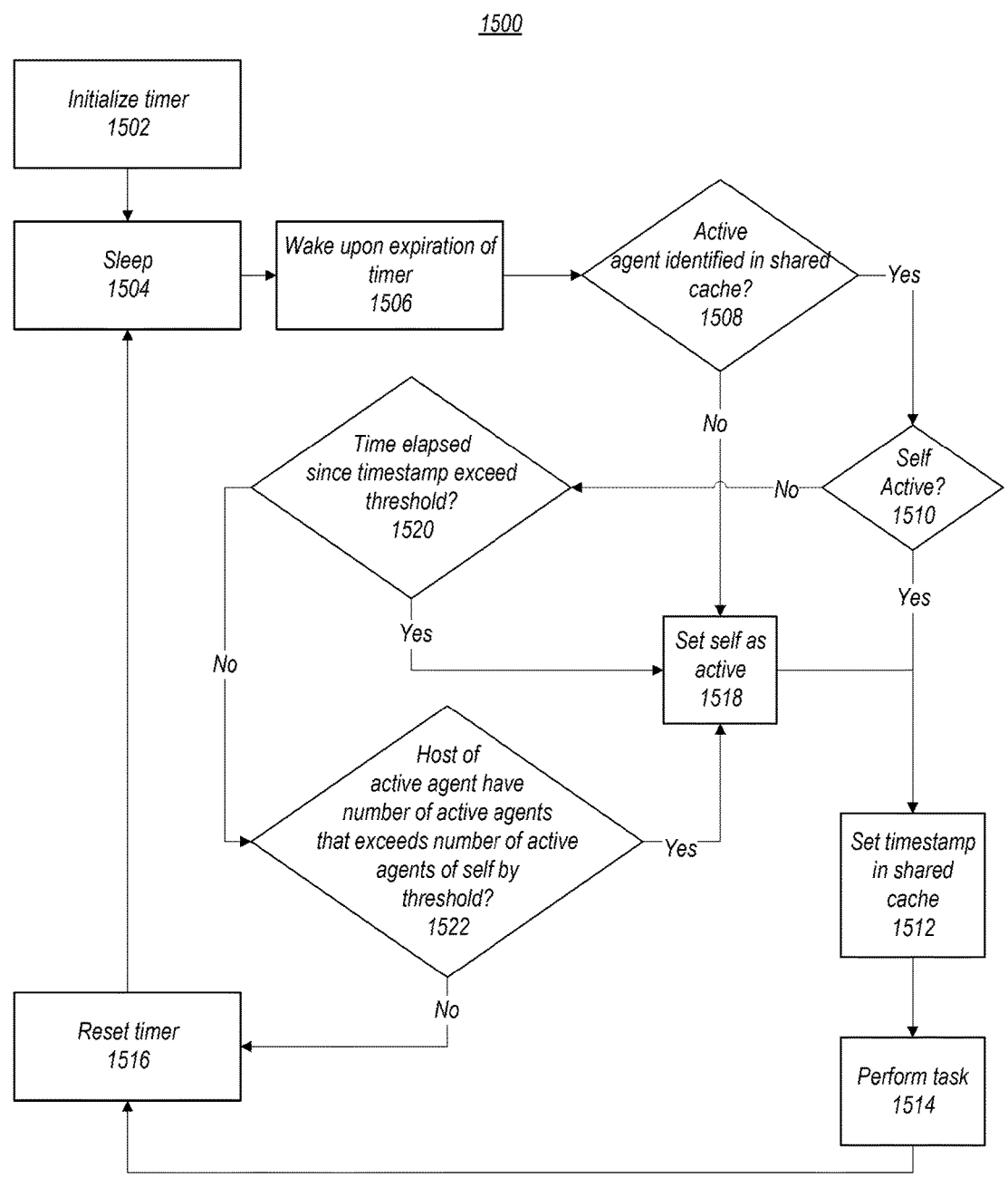
FIG. 15 illustrates an example of a first logic flow for a host instance, according to some embodiments of the present technology.

FIG. 15 illustrates an example embodiment of a logic flow 1500. The logic flow 1500 may be representative of some or all of the operations executed by one or more embodiments described herein. More specifically, the logic flow 1500 may illustrate operations performed by one or more components of host cluster 1202, such as host instances and/or service agents. In one or more embodiments, these operations may be performed in conjunction with decentralized load balancing of tasks in a workload. Embodiments are not limited in this context.

In the illustrated embodiment shown in FIG. 15, the logic flow 1500 may begin at block 1502. At block 1902, a timer may be initialized. The logic flow 1500 may enter a processing loop when transitioning to block 1504. At block 1504, a service agent may be in or transition to a sleep state. For instance, a service agent may be initialized and placed into a sleep state. In another example, a service agent may transition to or remain in a sleep state in response to determining it is not needed for processing tasks in a workload based on one or more data structures in a shared cache.

Continuing to block 1506, a service agent may wake upon expiration of the timer. In various embodiments, the timer may enable a service agent to periodically monitor a shared cache to determine whether to begin processing tasks. In one or more embodiments, each service agent in host cluster 1202 may be associated with a separate timer. In one or more such embodiments, the duration of the timers may be controlled and/or adjusted. In various embodiments, initialization of the timers may be staggered. Proceeding to block 1508, upon waking, the service agent may determine whether an active agent is identified in a shared cache for the type of task performed by the service agent. For instance, service agent 1208-1 may determine an active agent 1404-1 is identified for task type 1304-1. If an active agent is identified in the shared cache, logic flow 1500 may proceed to block 1510. At block 1510, the service agent may determine whether it is the active agent identified in the shared cache. For instance, the service agent may access one or more data structures in the shared cache to determine one or more service agents identified as active for their respective task type. If the service agent identifies itself as an active agent indicated in the shared cache, logic flow 1500 may proceed to block 1512.

At block 1512, the service agent may set a timestamp in the shared cache associated with execution of a task by an active agent. For instance, the timestamp may indicate the last time the service agent performed a task. In such instances, the timestamp may be used to calculate how much time has elapsed since the last time the task was performed. Proceeding to block 1514, a task may be performed by the service agent. Thus, in the illustrated embodiments, the timestamp may be associated with when performance of a task was initiated. However, in some embodiments, the timestamp may be set or updated after performance of a task. In still further embodiments, the timestamp may be updated before and after execution of a task. In other embodiments, the shared cache may include separate timestamps. For instance, a first timestamp may be associated with initiation of a task and a second timestamp may be associated with completion of a task.

Continuing to block 1516, the service agent may reset the timer and transition to a sleep state at block 1504. In various embodiments, the service agent may only reset the timer and enter a sleep state when no more tasks for the respective task type are awaiting execution, such as in task queue 1365. Referring back to block 1508, if an active agent is not identified in the shared cache, the logic flow 1500 may continue to block 1518. At block 1518, the service agent may set itself as one or more active agents indicated in the shared cache. Next, the logic flow 1500 may proceed to block 1512 and proceed as described above.

Referring back to block 1510, if the service agent determines it is not identified as an active agent for the respective task type, the logic flow 1500 may proceed to block 1520. At block 1520, the service agent may determine a time elapsed since a timestamp exceeds a service threshold. In some embodiments, the service agent may compare one or more timestamps associated with the respective task type in the shared cache to one or more service thresholds. If the time elapsed exceeds the service threshold, the logic flow 1500 may proceed to block 1518 and proceed as described above. However, if the time elapsed does not exceed the service threshold, the logic flow 1500 may proceed to block 1522.

At block 1522, the service agent may determine whether the host instances of the active agents identified in the shared cache have a number of active agents that exceeds a load difference threshold. In some embodiments, the load difference threshold may include a maximum difference between the number of active agents on the host instance of the service agent and the number of active agents of the host instance identified in the shared cache. If the number of active agents of the host instance that includes the active agent exceeds the load difference threshold, the logic flow 1500 may proceed to block 1518. In various embodiments, if the number of active agents of the host instance that includes the active agent exceeds the load difference threshold, the service agent may replace or remove the indication in the shared cache that identifies the other service agent as an active agent for the respective task type. However, if the number of active agents of the host instance that includes the active agent does not exceeds the load difference threshold, the logic flow 1500 may proceed to block 1516, and proceed as described above.

Figure 16A:
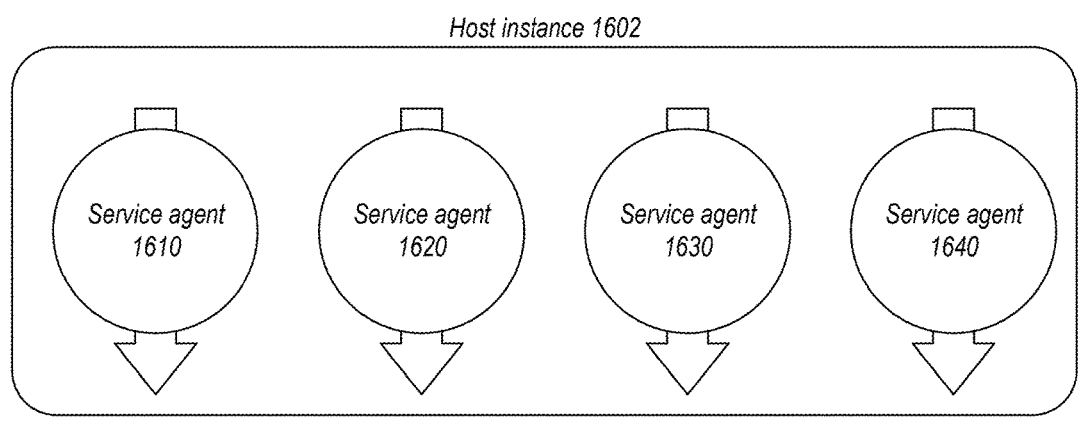
FIGS. 16A and 16B illustrate exemplary states of a host instance, according to some embodiments of the present technology.
Figure 16B:
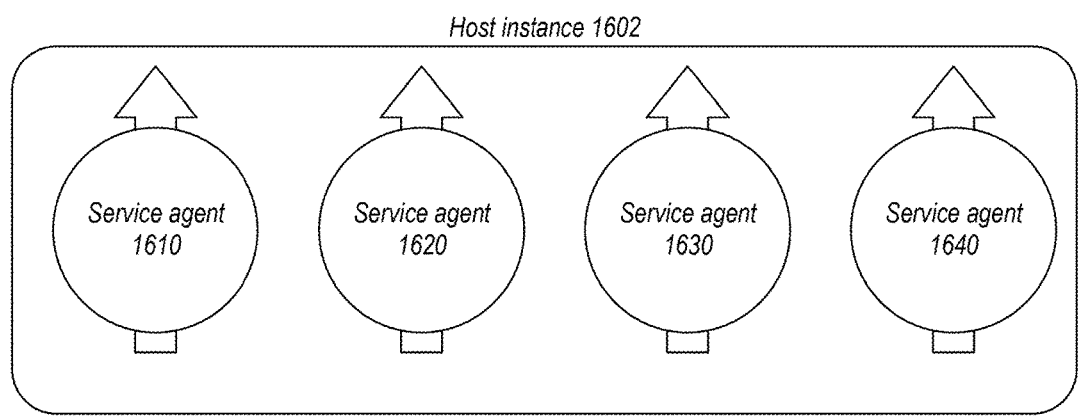

FIGS. 16A and 16B illustrate exemplary states 1600A, 1600B of a host instance 1602 that may be representative of various embodiments. In the illustrated embodiments, host instance 1602 may include service agents 1610, 1620, 1630, 1640. In FIGS. 16A and 16B, service agents with an arrow pointing toward the bottom of the page (e.g., service agents in state 1600A) may indicate the service agent is in a sleep state, and service agents with an arrow pointing toward the top of the page (e.g., service agents in state 1600B may indicate the service agent is in an active state. In the illustrated embodiments, each of the service agents of the host instance 1602 may be associated with a different task type. In state 1600A, each service agent of host instance 1602 may be in a sleep state, such as in response to initialization or a previous determination that it was not needed to perform tasks. In various embodiments, upon expiration of a timer, each service agent may determine to set themselves as an active agent for their respective task types in a shared cache, as shown in state 1600B of host instance 1602. Embodiments are not limited in this context.

Figure 17A:
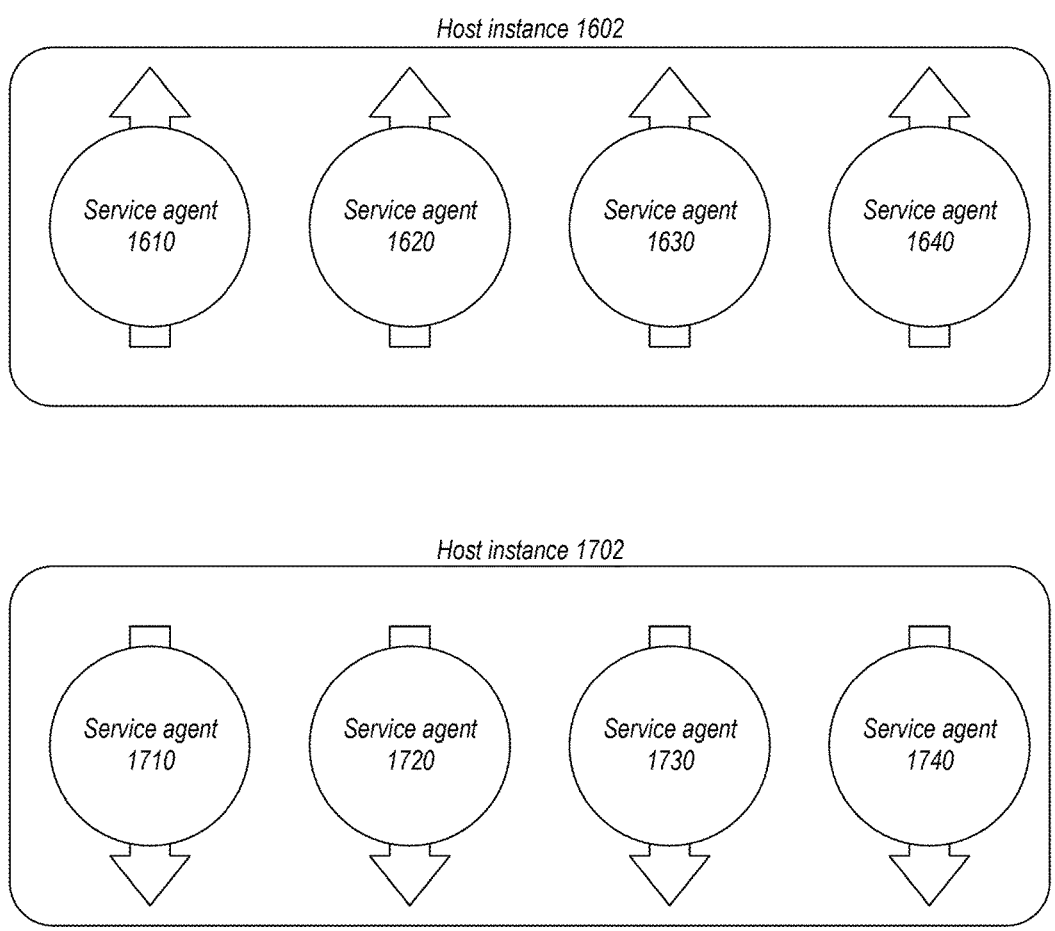
FIGS. 17A-17C illustrate exemplary states of a host cluster, according to some embodiments of the present technology.
Figure 17B:
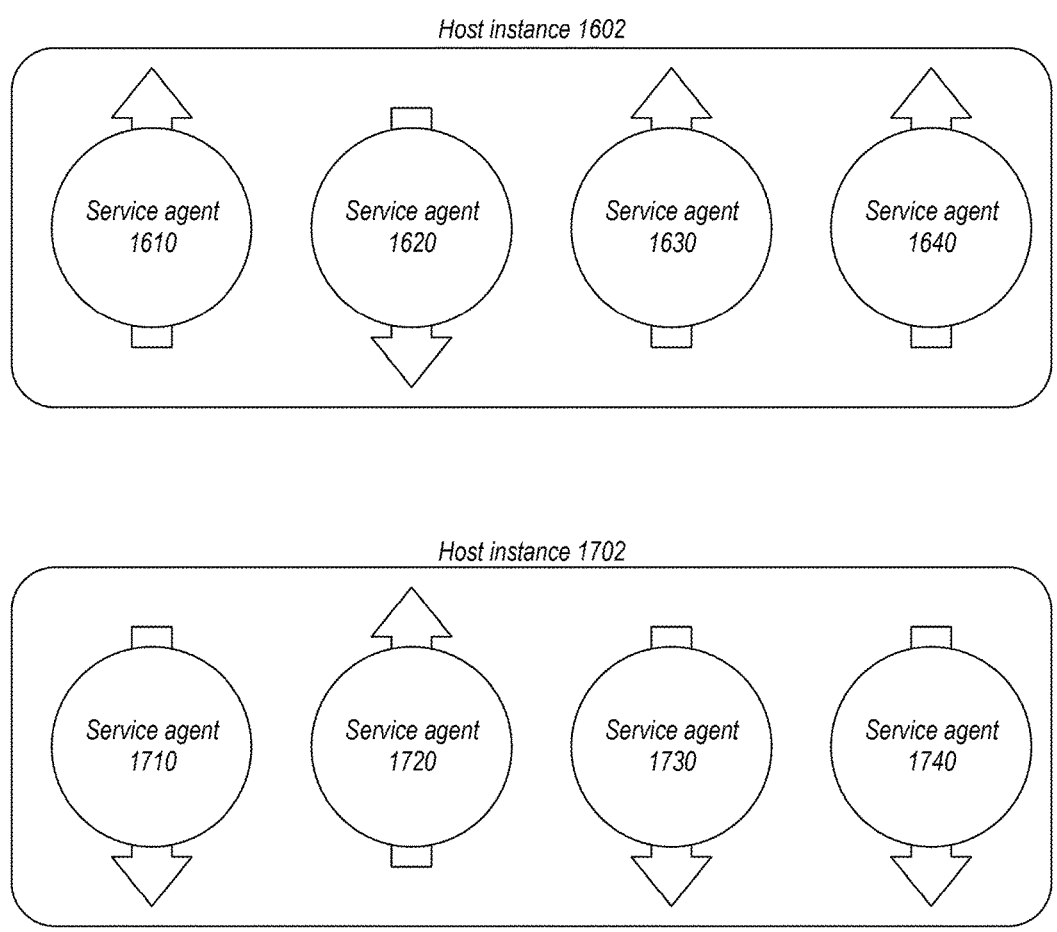
Figure 17C:
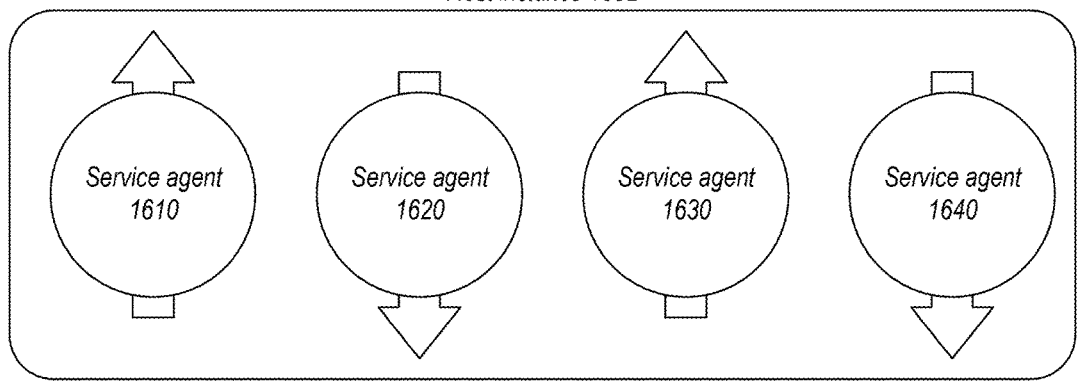
Figure 17C:
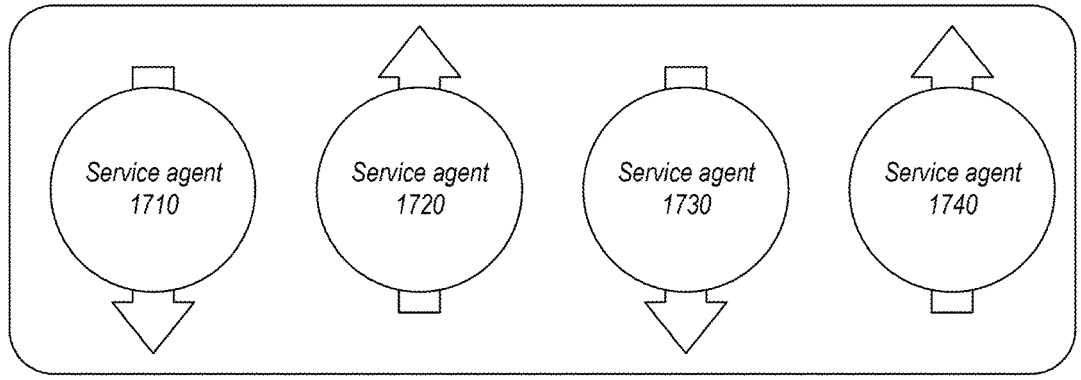

FIGS. 17A-17C illustrate exemplary states 1700A, 1700B, 1700C of host instances 1602, 1702 that may be representative of various embodiments. In the illustrated embodiments, host instance 1602 may include service agents 1610, 1620, 1630, 1640 and host instance 1702 may include service agents 1710, 1720, 1730, 1740. In some embodiments, states 1700A, 1700B, 1700C may occur subsequent to states 1600A, 1600B discussed previously. Similar to FIGS. 16A and 16B, in FIGS. 17A-17C, service agents with an arrow pointing toward the bottom of the page may indicate the service agent is in a sleep state and service agents with an arrow pointing toward the top of the page may indicate the service agent is in an active state. In one or more embodiments described herein, FIGS. 17A-17C may illustrate various states associated with balancing the number of active agents among different host instances 1602, 1702. In one or more such embodiments, this may be based on comparing the difference between a number of service agents in the active state on host instance 1602 and a number of service agents in the active state on host instance 1702 to a load difference threshold. Embodiments are not limited in this context.

In some embodiments, in states 1700A, 1700B, 1700C, only one active agent of each task type may be allowed at a time. In the illustrated embodiments, service agents 1610, 1710 may be associated with the same task type, service agents 1620, 1720 may be associated with the same task type, service agents 1630, 1730 may be associated with the same task type, and service agents 1640, 1740 may be associated with the same task type. Additionally, the task type associated with each service agent in a respective host instance may be different. In various embodiments, host instances 1602, 1702 may have the same processing capabilities.

Referring to FIG. 17A, state 1700A may include all service agents of host instance 1602 being in an active state and identified as active agents in a shared cache and all service agents of host instance 1702 being in a sleep state. In state 1700A, each service agent of host instance 1702 may be in a sleep state in response to initialization or a previous determination the service agent was not needed to perform tasks in a workload. In some embodiments, service agent 1720 of host instance 1702 may awaken and determine the number of active service agents implemented by host instance 1602 and identified in the shared cache results in a load difference threshold being exceeded. For example, if the load difference threshold is zero, service agent 1720 may calculate the load difference threshold of host instance 1602 as follows. Since host instance 1602 has four active service agents and host instance 1702 has zero active service agents, the difference between active service agents associated with host instance 1602 and host instance 1702 may be four since 4−0=4. Accordingly, the load difference threshold of zero is exceeded.

Proceeding to state 1700B of FIG. 17B, in response to determining the load difference threshold is exceeded, service agent 1720 may update the shared cache to identify itself instead of service agent 1620 as the active agent for the respective task type. In such embodiments, service agent 1620 may transition to a sleep state in response to being replaced as the active service agent. In some embodiments, service agent 1740 of host instance 1702 may awaken (e.g., transition from a sleep state to an active state) and determine the number of active service agents implemented by host instance 1602 and identified in the shared cache still results in the load difference threshold being exceeded. For example, if the load difference threshold is zero, service agent 1740 may calculate the load difference threshold of host instance 1602 as follows. Since host instance 1602 has three active service agents and host instance 1702 has one active service agent, the difference between active service agents associated with host instance 1602 and host instance 1702 may be two since 3−1=2. Accordingly, the load difference threshold of zero is exceeded.

Continuing to state 1700C of FIG. 17C, in response to determining the load difference threshold is exceeded, service agent 1740 may update the shared cache to identify itself instead of service agent 1640 as the active agent for the respective task type. In such embodiments, service agent 1640 may transition to a sleep state in response to being replaced as the active service agent. Subsequently, in various embodiments, service agent 1710 of host instance 1702 may awaken and determine the number of active service agents implemented by host instance 1602 and identified in the shared cache no longer results in the load difference threshold being exceeded. For example, if the load difference threshold is zero, service agent 1710 may calculate the load difference threshold of host instance 1602 as follows. Since host instance 1602 has two active service agents and host instance 1702 has two active service agents, the difference between active service agents associated with host instance 1602 and host instance 1702 may be zero since 2−2=0. Accordingly, the load difference threshold of zero is not exceeded. In response to determining the load difference threshold is not exceeded, service agent 1710 may return to a sleep state.

Figure 18A:
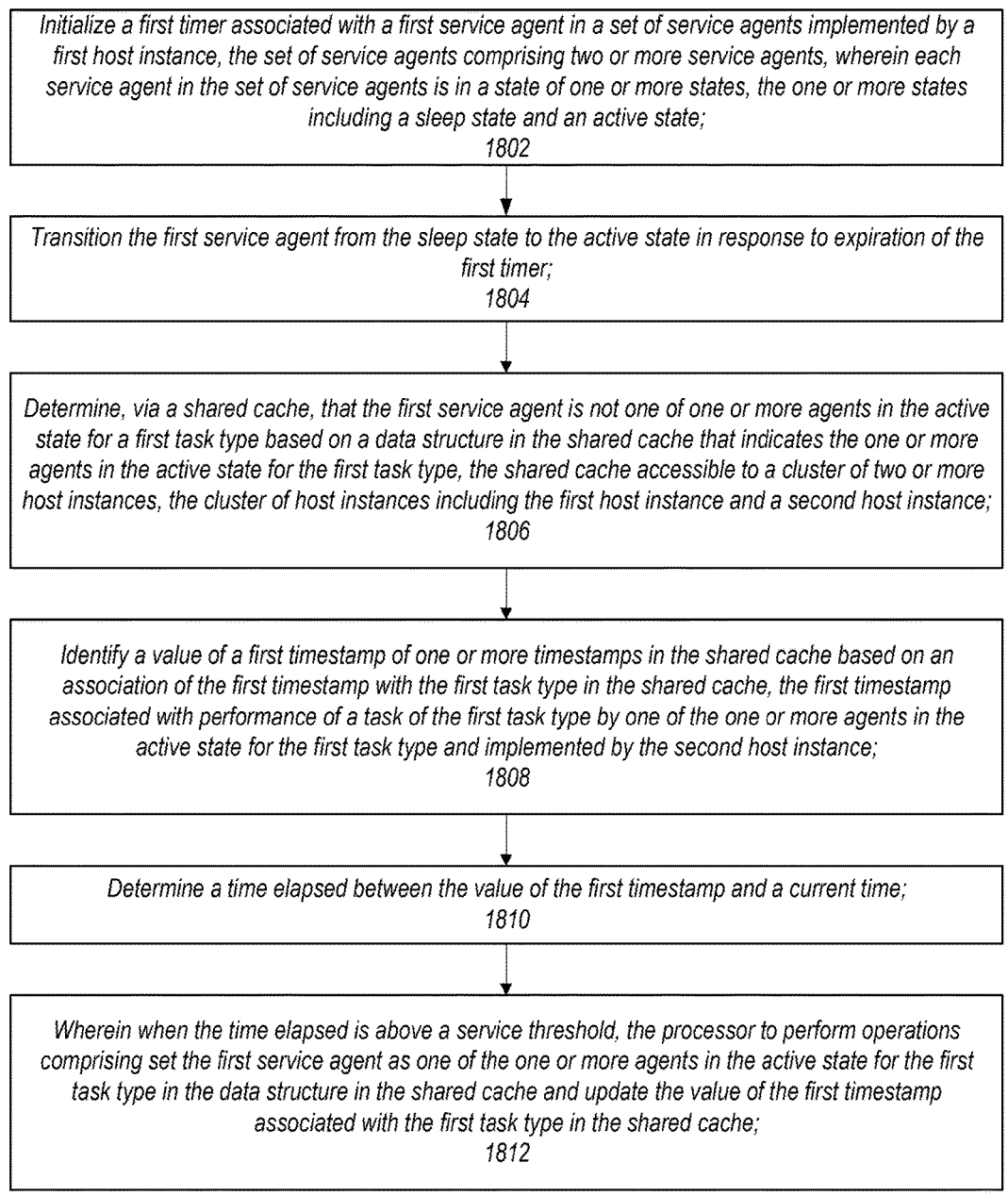

FIGS. 18A and 18B illustrate an embodiment of a logic flow 1800. The logic flow 1800 may be representative of some or all of the operations executed by one or more embodiments described herein. More specifically, the logic flow 1800 may illustrate operations performed by one or more components of host cluster 1202, such as host instances 1204 and/or service agents. In one or more embodiments, these operations may be performed in conjunction with generating, monitoring, and/or updating a shared cache to perform decentralized load balancing. Embodiments are not limited in this context.

In the illustrated embodiment shown in FIG. 18A, the logic flow 1800 may begin at block 1802. At block 1802, a first timer associated with a first service agent in a set of service agents implemented by a first host instance may be initialized, the set of service agents comprising two or more service agents, wherein each service agent in the set of service agents is in a state of one or more states, the one or more states including a sleep state and an active state. For instance, a timer associated with service agent 1206-1 may be initialized. In some instances, service agents 1610, 1620, 1630, 1640 may be in the active state while service agents 1710, 1720, 1730, 1740 are in the sleep state. Proceeding to block 1804, the first service agent may transition from the sleep state to the active state in response to expiration of the first timer. For instance, service agent 1610 may transition to the active state in response to expiration of a timer (see e.g., FIGS. 16A and 16B).

Continuing to block 1806, the first service agent may be determined not to be one of one or more agents in the active state for a first task type based on a data structure in the shared cache that indicates the one or more agents in the active state for the first task type, the shared cache accessible to a cluster of two or more host instances, the cluster of host instances including the first host instance and a second host instance. For instance, service agent 1206-2 may access shared cache 1312 to determine it is not an active agent (e.g., active agent 1306-1). At block 1808, a value of a first timestamp of one or more timestamps in the shared cache may be identified based on an association of the first timestamp with the first task type in the shared cache, the first timestamp associated with performance of a task of the first task type by one of the one or more agents in the active state for the first task type and implemented by the second host instance. For instance, the value of timestamp 1310-1 may be identified based on its association with task type 1304-1 (see e.g., FIG. 13A). At block 1810 a time elapsed between the value of the first timestamp and a current time may be determined. For example, a time elapsed between the value of the timestamp 1310-1 and a current time may be determined by service agent 1208-1.

Proceeding to block 1812, wherein when the time elapsed is at or above a service threshold, the processor to perform operations comprising set the first service agent as one of the one or more agents in the active state for the first task type in the data structure in the shared cache and update the value of the first timestamp associated with the first task type in the shared cache. For instance, service agent 1730 may update shared cache 1362 such that task type 1354-1 indicates service agent 1730 in active agent(s) 1356-1 and update a timestamp of timestamp(s) 1360-1. Continuing to block 1814, wherein when the time elapsed is at or below the service threshold, the processor to perform operations comprising identify a number of agents in the active state associated with the second host instance via the shared cache. For instance, the number of active service agents associated with host instance 1204-*n* may be determined. It will be appreciated that although the logic flow 1800 utilizes the conditionals 'above the service threshold' and 'at or below the service threshold' any conditionals maybe used in a comparison without departing from the scope of this disclosure. For example, the conditionals may include 'at or above the service threshold' and 'below the service threshold'.

Going on to block 1816, wherein when the time elapsed is at or below the service threshold, the processor to perform operations comprising place the first service agent in the sleep state when a difference between the number of agents in the active state associated with the second host instance and a number of agents in the active state associated with the first host instance is at or below a load difference threshold. For example, service agent 1710 may be placed in a sleep state when a difference between the number of agents in the active state associated with the second host instance and a number of agents in the active state associated with the first host instance is at or below a load difference threshold. Proceeding to block 1818, wherein when the time elapsed is at or below the service threshold, the processor to perform operations comprising set the first service agent as one of the one or more agents in the active state for the first task type in the shared cache and update the value of the first timestamp in the shared cached when the difference between the number of agents in the active state associated with the second host instance and the number of agents in the active state associated with the first host instance is above the load difference threshold. For instance, active agent(s) 1356-*n* and timestamp(s) 1360-*n* of task type 1354-*n* in shared cached 1362 may be updated. It will be appreciated that although the logic flow 1900 utilizes the conditionals 'at or below the load difference threshold' and 'above the load difference threshold' any conditionals maybe used in a comparison without departing from the scope of this disclosure. For example, the conditionals may include 'at or below the load difference threshold' and 'above the load difference threshold'.

Figure 19A:
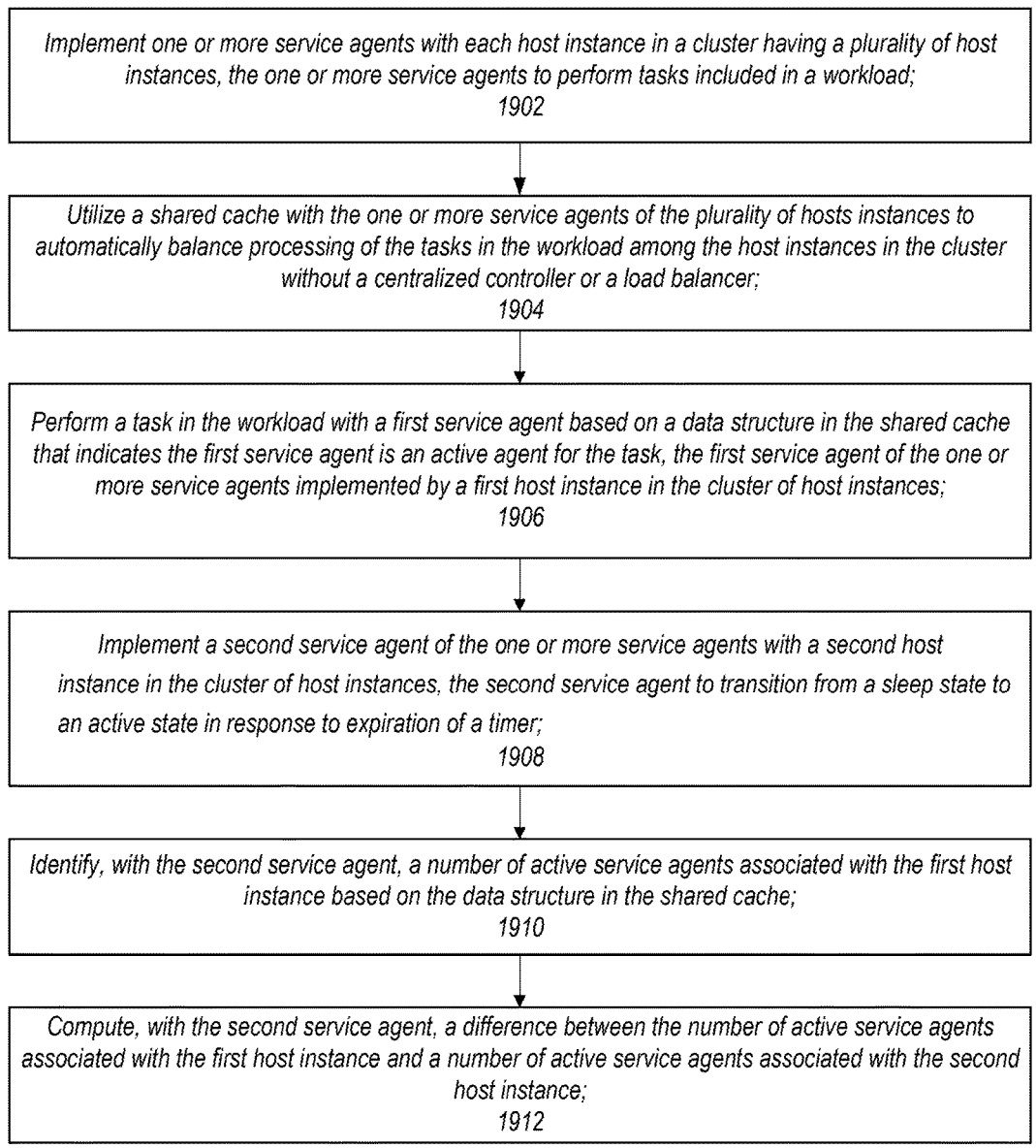

FIG. 19 illustrates an embodiment of a logic flow 1900. The logic flow 1900 may be representative of some or all of the operations executed by one or more embodiments described herein. More specifically, the logic flow 1900 may illustrate operations performed by one or more components of host cluster 1202, such as host instances 1204 and/or service agents. In one or more embodiments, these operations may be performed in conjunction with generating, monitoring, and/or updating a shared cache to perform decentralized load balancing. Embodiments are not limited in this context.

In the illustrated embodiment shown in FIG. 19, the logic flow 1900 may begin at block 1902. At block 1902, one or more service agents with each host instance in a cluster having a plurality of host instances, the one or more service agents to perform tasks included in a workload. For example, the service agents of host cluster 1202 may perform tasks included in a workload. Continuing to block 1904, a shared cached may be utilized by the one or more service agents of the plurality of hosts instances to automatically balance processing of the tasks in the workload among the host instances in the cluster without a centralized controller or a load balancer. For instance, shared cached 1362 may be utilized by one or more service agents in host cluster 1202.

Proceeding to block 1906, a task in the workload may be performed with a first service agent based on a data structure in the shared cache that indicates the first service agent is an active agent for the task, the first service agent of the one or more service agents implemented by a first host instance in the cluster of host instances. For example, service agent 1208-*n* may perform a task based on a data structure in shared cache 1212. At block 1908, a second service agent may be implemented with a second host instance in the cluster of host instances, the second service agent to transition from a sleep state to an active state in response to expiration of a timer. For instance, service agent 1210-1 may be implemented by host instance 1204-*n*. In such instance, service agent 1210-1 may transition from a sleep state to an active state in response to expiration of a timer.

Continuing to block 1910, a number of active service agents associated with the first host instance may be identified with the second service agent based on the data structure in the shared cache. For example, the number of active service agent associated with host instance 1204-2 may be identified by service agent 1210-1 of host instance 1204-*n* based on shared cached 1212. At block 1912, a difference between the number of active service agents associated with the first host instance and a number of active service agents associated with the second host instance may be computed by the second service agent. For instance, service agent 1210-1 may determine the difference in the number of active service agents associated with host instance 1204-2 and host instance 1204-*n*.

At block 1914, the difference between the number of active service agents associated with the first host instance and the number of active service agents associated with the second host instance may be compared to a load difference threshold by the second service agent. For instance, service agent 1210-1 may compare the difference to a load difference threshold between host instance 1204-2 and host instance 1204-*n*. In some embodiments, the load difference threshold may be stored in the shared cache. Continuing to block 1916, the data structure in the shared cache may be updated by the second service agent to indicate that the second service agent is the active agent for the task to reduce a portion of the workload performed by the first service agent of the one or more service agents implemented by the first host instance in the cluster of host instances when the difference between the number of active service agents associated with the first host instance and the number of active service agents associated with the second host instance exceeds the load difference threshold. For example, service agent 1210-1 may update shared cache 1312 to indicate that service agent 1210-1 is the active agent for the task.

In many embodiments, one or more portions of the processing or logic flows described herein, including the components of which each is composed, may be selected to be operative on whatever type of processor or processors that are selected to implement one or more of host instances 1204. For instance, these may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

In various embodiments, one or more processors and/or devices used to implement portions of the processing or logic flows described herein may be selected to efficiently perform one or more operations described herein. In some embodiments, one or more operations described herein may be performed at least partially in parallel. By way of example, processors may incorporate a single-instruction multiple-data (SIMD) architecture, may incorporate multiple processing pipelines, and/or may incorporate the ability to support multiple simultaneous threads of execution per processing pipeline.

In some embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processing or logic circuitry. Where one or more device drivers are included, those device drivers may provide support for any of a variety of other components, whether hardware or software components, described herein.

In various embodiments, one or more components of host cluster 1202 (e.g., host instance 1204-1, 1204-2, 1204-*n*) may utilize or include storage and/or memory (e.g., shared cache 1212). In various such embodiments, the storage and/or memory may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in one or more embodiments, storage and/or memory of one or more of the node may be implemented with a redundant array of independent discs (RAID) of a RAID level selected to provide fault tolerance to prevent loss of one or more of these datasets and/or to provide increased speed in accessing one or more of these datasets.

In various embodiments, one or more of the interfaces described herein may each utilize or include any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. Various embodiments may include or utilize one or more displays to present information. In various such embodiments, each of the displays may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

Some embodiments may include one or more network interfaces that employ any of a wide variety of communications technologies enabling these devices to be coupled to one or more other devices. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, a network interface may be implemented with multiple copper-based or fiber-optic based network interface ports to provide redundant and/or parallel pathways in exchanging data.

In various embodiments, the processing, memory, and/or storage resources of host cluster 1202 may be divided among the multiple systems (e.g., host instances 1204-1, 1204-2, 1204-*n*). In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission, and/or distribution via network interface that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. A system comprising:
   a cluster having a plurality of host instances, each host instance in the cluster, includes a processor and memory, to implement one or more service agents, the one or more service agents to perform tasks included in a workload;
   a shared cache utilized by the one or more service agents of the plurality of hosts instances to automatically balance processing of the tasks in the workload among the host instances in the cluster without a centralized controller or a load balancer;
   a first service agent of the one or more service agents implemented by a first host instance in the cluster of host instances to perform a task in the workload based on a data structure in the shared cache that indicates the first service agent is an active agent for the task;
   a second service agent of the one or more service agents implemented by a second host instance in the cluster of host instances to:
   transition from a sleep state to an active state in response to expiration of a timer;
   identify a number of active service agents associated with the first host instance based on the data structure in the shared cache;
   compute a difference between the number of active service agents associated with the first host instance and a number of active service agents associated with the second host instance;
   compare the difference between the number of active service agents associated with the first host instance and the number of active service agents associated with the second host instance to a load difference threshold, wherein the load difference threshold is a numerical value determined based on a comparison of processing capabilities of hardware resources available to the first host instance to processing capabilities of hardware resources available to the second host instance; and
   update the data structure in the shared cache to indicate that the second service agent is the active agent for the task when the difference between the number of active service agents associated with the first host instance and the number of active service agents associated with the second host instance exceeds the load difference threshold, the update to the data structure in the shared cache to reduce a portion of the workload performed by the first service agent of the one or more service agents implemented by the first host instance in the cluster of host instances.

2. The system of claim 1, wherein the first host instance and the second host instance have local access to a synchronized copy of the shared cached.

3. The system of claim 1, wherein the second service agent initializes a timer and transitions into the sleep state when the difference between the number of active service agents associated with the first host instance and the number of active service agents associated with the second host instance does not exceed the load difference threshold.

4. The system of claim 1, wherein the second service agent performs a second task in the workload and updates a timestamp in the shared cached to a current time based on performance of the second task.

5. The system of claim 4, wherein the data structure includes an association between the timestamp and a type of the task.

6. The system of claim 1, the first service agent comprising a metric collecting agent and wherein the task includes a portion of a resource metric collection service that monitors dynamic metrics associated with health of a software system.

7. The system of claim 1, wherein the first service agent updates a timestamp in the shared cached to indicate completion of the task.

8. The system of claim 1, wherein the first service agent identifies the task for performance based on a task queue in the shared cache.

9. The system of claim 1, wherein the load difference is set to zero based on the comparison indicating the processing capabilities of the hardware resources available to the first host instance are equal to the processing capabilities of the hardware resources available to the second host instance.

10. A computer-implemented method, comprising:
    implementing one or more service agents with each host instance in a cluster having a plurality of host instances, the one or more service agents to perform tasks included in a workload;
    utilizing a shared cache with the one or more service agents of the plurality of hosts instances to automatically balance processing of the tasks in the workload among the host instances in the cluster without a centralized controller or a load balancer;
    performing a task in the workload with a first service agent based on a data structure in the shared cache that indicates the first service agent is an active agent for the task, the first service agent of the one or more service agents implemented by a first host instance in the cluster of host instances;

implementing a second service agent of the one or more service agents with a second host instance in the cluster of host instances, the second service agent for:
- transitioning from a sleep state to an active state in response to expiration of a timer;
- identifying a number of active service agents associated with the first host instance based on the data structure in the shared cache;
- computing a difference between the number of active service agents associated with the first host instance and a number of active service agents associated with the second host instance;
- comparing the difference between the number of active service agents associated with the first host instance and the number of active service agents associated with the second host instance to a load difference threshold, wherein the load difference threshold is a numerical value determined based on a comparison of processing capabilities of hardware resources available to the first host instance to processing capabilities of hardware resources available to the second host instance; and
- updating the data structure in the shared cache to indicate that the second service agent is the active agent for the task when the difference between the number of active service agents associated with the first host instance and the number of active service agents associated with the second host instance exceeds the load difference threshold, the update to the data structure in the shared cache to reduce a portion of the workload performed by the first service agent of the one or more service agents implemented by the first host instance in the cluster of host instances.

11. The computer-implemented method of claim 10, wherein the first host instance and the second host instance have local access to a synchronized copy of the shared cached.

12. The computer-implemented method of claim 10, wherein the second service agent initializes a timer and transitions into the sleep state when the difference between the number of active service agents associated with the first host instance and the number of active service agents associated with the second host instance does not exceed the load difference threshold.

13. The computer-implemented method of claim 10, wherein the second service agent performs a second task in the workload and updates a timestamp in the shared cached to a current time based on performance of the second task.

14. The computer-implemented method of claim 13, wherein the data structure includes an association between the timestamp and a type of the task.

15. The computer-implemented method of claim 10, the first service agent comprising a metric collecting agent and wherein the task includes a portion of a resource metric collection service that monitors dynamic metrics associated with health of a software system.

16. The computer-implemented method of claim 10, wherein the first service agent updates a timestamp in the shared cached to indicate completion of the task.

17. The computer-implemented method of claim 10, wherein the first service agent identifies the task for performance based on a task queue in the shared cache.

18. The computer-implemented method of claim 10, wherein the load difference is set to zero based on the comparison indicating the processing capabilities of the hardware resources available to the first host instance are equal to the processing capabilities of the hardware resources available to the second host instance.

19. A computer-program product tangibly embodied in a non-transitory machine-readable storage medium, the computer-program product including instructions operable to cause a processor to perform operations comprising:
- implement one or more service agents with each host instance in a cluster having a plurality of host instances, the one or more service agents to perform tasks included in a workload;
- utilize a shared cache with the one or more service agents of the plurality of hosts instances to automatically balance processing of the tasks in the workload among the host instances in the cluster without a centralized controller or a load balancer;
- perform a task in the workload with a first service agent based on a data structure in the shared cache that indicates the first service agent is an active agent for the task, the first service agent of the one or more service agents implemented by a first host instance in the cluster of host instances;
- implement a second service agent of the one or more service agents with a second host instance in the cluster of host instances, the second service agent to:
  - transition from a sleep state to an active state in response to expiration of a timer;
  - identify a number of active service agents associated with the first host instance based on the data structure in the shared cache;
  - compute a difference between the number of active service agents associated with the first host instance and a number of active service agents associated with the second host instance;
  - compare the difference between the number of active service agents associated with the first host instance and the number of active service agents associated with the second host instance to a load difference threshold, wherein the load difference threshold is a numerical value determined based on a comparison of processing capabilities of hardware resources available to the first host instance to processing capabilities of hardware resources available to the second host instance; and
  - update the data structure in the shared cache to indicate that the second service agent is the active agent for the task when the difference between the number of active service agents associated with the first host instance and the number of active service agents associated with the second host instance exceeds the load difference threshold, the update to the data structure in the shared cache to reduce a portion of the workload performed by the first service agent of the one or more service agents implemented by the first host instance in the cluster of host instances.

20. The computer-program product of claim 19, wherein the first host instance and the second host instance have local access to a synchronized copy of the shared cached.

21. The computer-program product of claim 19, wherein the second service agent initializes a timer and transitions into the sleep state when the difference between the number of active service agents associated with the first host instance and the number of active service agents associated with the second host instance does not exceed the load difference threshold.

22. The computer-program product of claim 19, wherein the second service agent performs a second task in the workload and updates a timestamp in the shared cached to a current time based on performance of the second task.

23. The computer-program product of claim 22, wherein the data structure includes an association between the timestamp and a type of the task.

24. The computer-program product of claim 19, the first service agent comprising a metric collecting agent and wherein the task includes a portion of a resource metric collection service that monitors dynamic metrics associated with health of a software system.

25. The computer-program product of claim 19, wherein the first service agent updates a timestamp in the shared cached to indicate completion of the task.

26. The computer-program product of claim 19, wherein the first service agent identifies the task for performance based on a task queue in the shared cache.

27. The computer-program product of claim 19, wherein the load difference is set to zero based on the comparison indicating the processing capabilities of the hardware resources available to the first host instance are equal to the processing capabilities of the hardware resources available to the second host instance.

\* \* \* \* \*